United States Patent
Nakayama et al.

(10) Patent No.: US 8,717,954 B2
(45) Date of Patent: May 6, 2014

(54) BASE STATION AND SIGNAL PROCESSING METHOD

(75) Inventors: Yoshihisa Nakayama, Kawasaki (JP); Noriaki Kono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 13/471,593

(22) Filed: May 15, 2012

(65) Prior Publication Data

US 2012/0224515 A1    Sep. 6, 2012

Related U.S. Application Data

(63) Continuation of application No. PCT/JP2009/006587, filed on Dec. 3, 2009.

(51) Int. Cl.
*H04B 7/00* (2006.01)
*H04W 56/00* (2009.01)

(52) U.S. Cl.
CPC .................. *H04W 56/0005* (2013.01)
USPC ....................................... 370/310

(58) Field of Classification Search
CPC ............................. H04W 56/0005
USPC ............ 370/310, 328, 350; 455/422; 709/248
See application file for complete search history.

(56) References Cited

U.S. PATENT DOCUMENTS

| | | | |
|---|---|---|---|
| 7,643,832 B2 * | 1/2010 | Cudak et al. | 455/450 |
| 7,991,084 B2 * | 8/2011 | Hooli et al. | 375/343 |
| 7,995,680 B2 | 8/2011 | Wang et al. | |
| 8,165,105 B2 * | 4/2012 | Do | 370/350 |
| 8,199,778 B2 * | 6/2012 | Shimomura et al. | 370/491 |
| 8,223,908 B2 * | 7/2012 | Gaal et al. | 375/354 |
| 8,542,783 B2 * | 9/2013 | Zhou et al. | 375/343 |
| 2007/0253465 A1 * | 11/2007 | Muharemovic et al. | 375/130 |
| 2008/0232513 A1 | 9/2008 | Wang et al. | |

(Continued)

FOREIGN PATENT DOCUMENTS

| | | |
|---|---|---|
| JP | 2008-206058 | 9/2008 |
| JP | 2008-236744 | 10/2008 |
| WO | 2008/081531 | 7/2008 |

OTHER PUBLICATIONS

International Preliminary Report on Patentability and Written Opinion of the International Searching Authority dated Jul. 31, 2012, from corresponding International Application No. PCT/JP2009/006587, 11 pages.

(Continued)

*Primary Examiner* — Dmitry H Levitan
(74) *Attorney, Agent, or Firm* — Katten Muchin Rosenman LLP

(57) ABSTRACT

A base station receives from a mobile station, a reference signal that includes two or more sequences of a fixed length and calculates, as information for uplink signal synchronization at the mobile station, delay with respect to a reference time of the reference signal. The base station includes a first correlator that calculates the delay and a first correlation value calculated by correlating known sequences and the reference signal received during a first interval set based on the reference time and including a period equivalent to the fixed length; a second correlator that calculates a second correlation value by correlating the known sequences and the reference signal received during a second interval different from the first interval and including a period equivalent to the fixed length; and a corrector that based on a comparison result of the first and the second correlation values, determines whether to correct the calculated delay.

12 Claims, 19 Drawing Sheets

(56) References Cited

U.S. PATENT DOCUMENTS

2009/0086713 A1* 4/2009 Luo ............................. 370/350
2009/0305693 A1 12/2009 Shimomura et al.
2013/0136085 A1* 5/2013 Ogawa et al. ................. 370/329

OTHER PUBLICATIONS

International Search Report dated Jan. 19, 2010, from corresponding International Application No. PCT/JP2009/006587, 1 page.

3GPP TS 36.211 V8.7.0 (May 2009) 3rd Generation Partnership Project; Technical Specification Group Radio Access Network; Evolved Universal Terrestrial Radio Access (E-UTRA); Physical Channels and Modulation (Release 8), May 2009, 16 pages.

3GPP TS 36.211 V8.8.0 (Sep. 2009) 3rd Generation Partnership Project; Technical Specification Group Radio Access Network; Evolved Universal Terrestrial Radio Access (E-UTRA); Physical Channels and Modulation (Release 8), Sep. 2009, 83 pages.

* cited by examiner

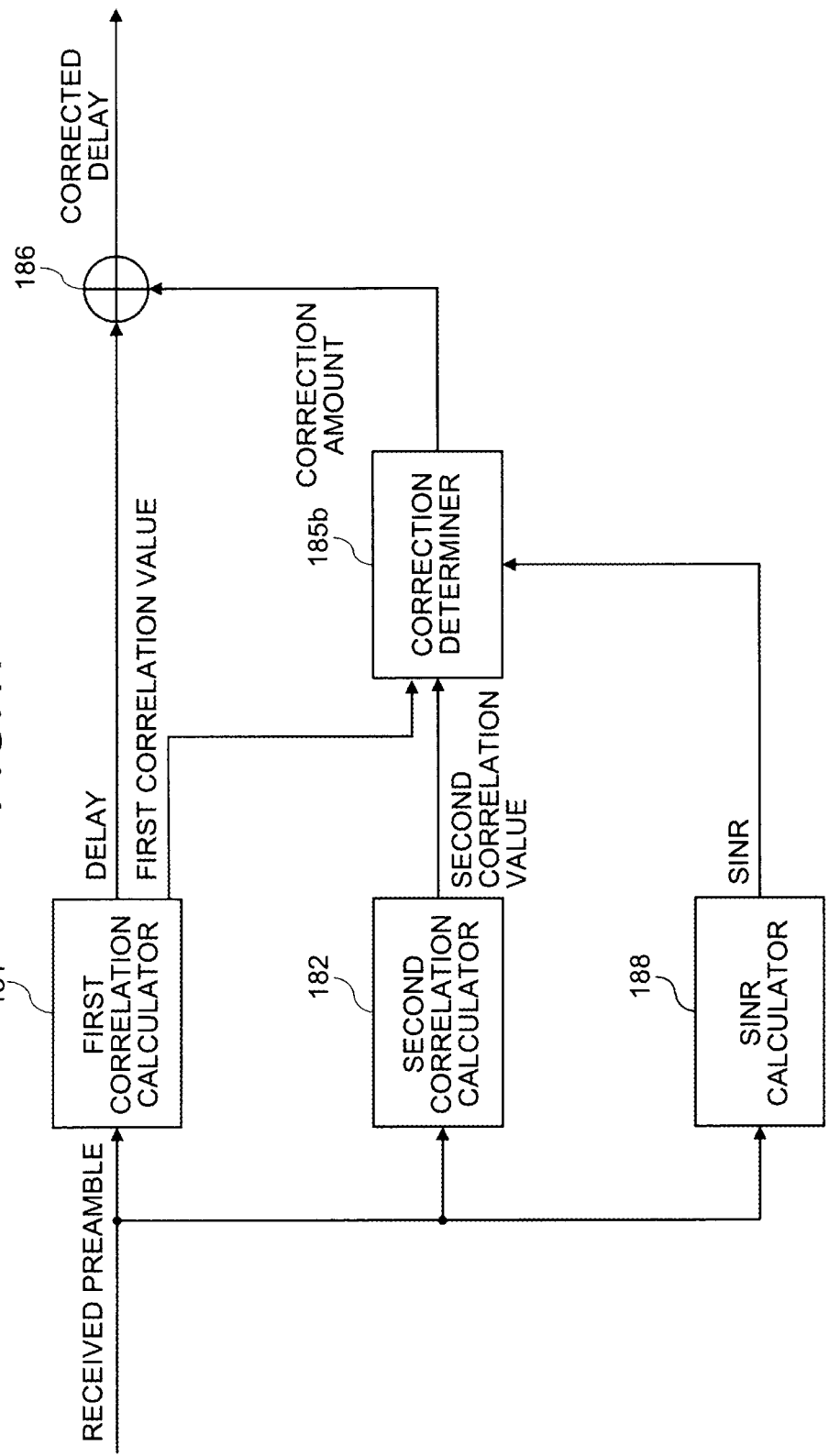

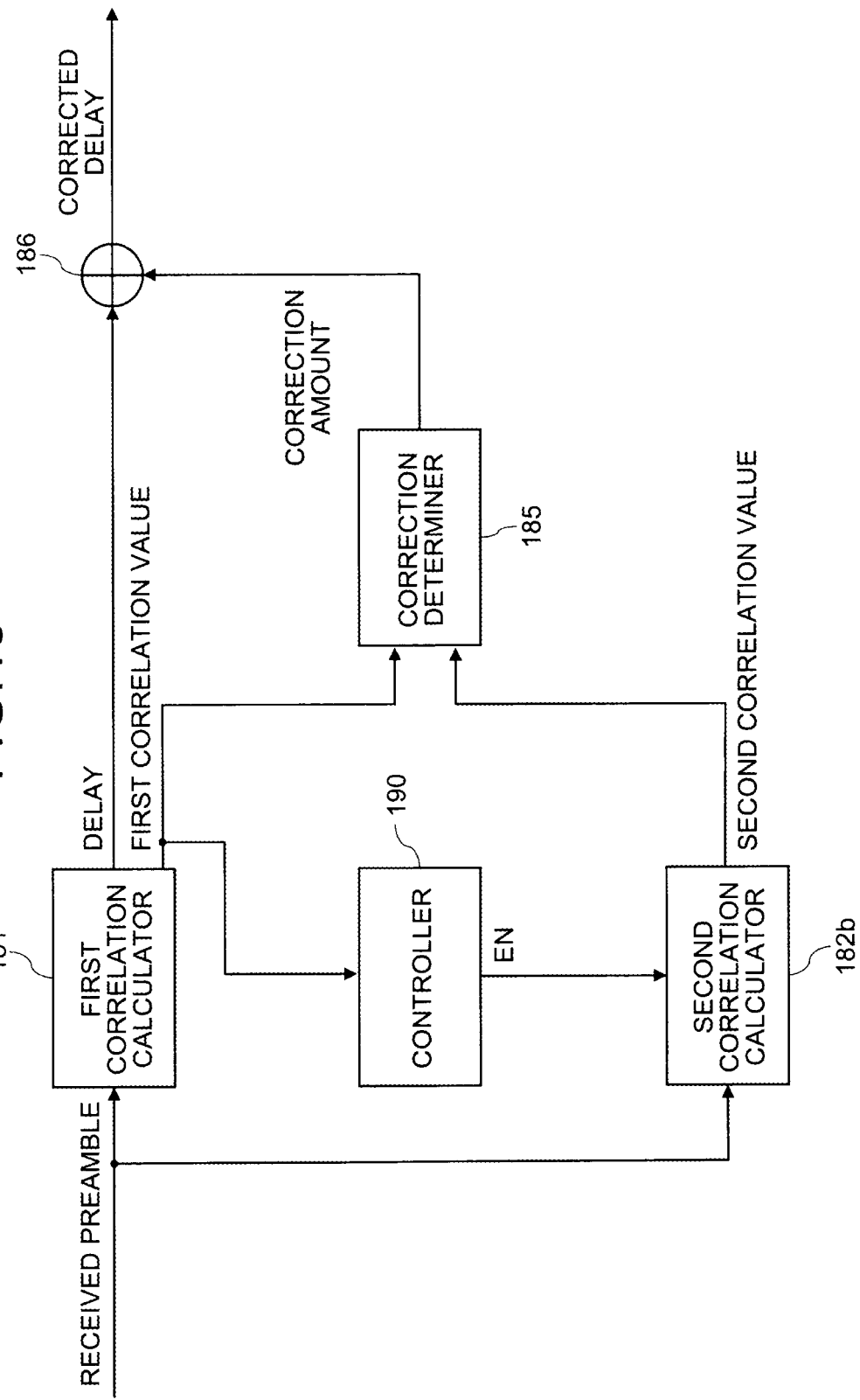

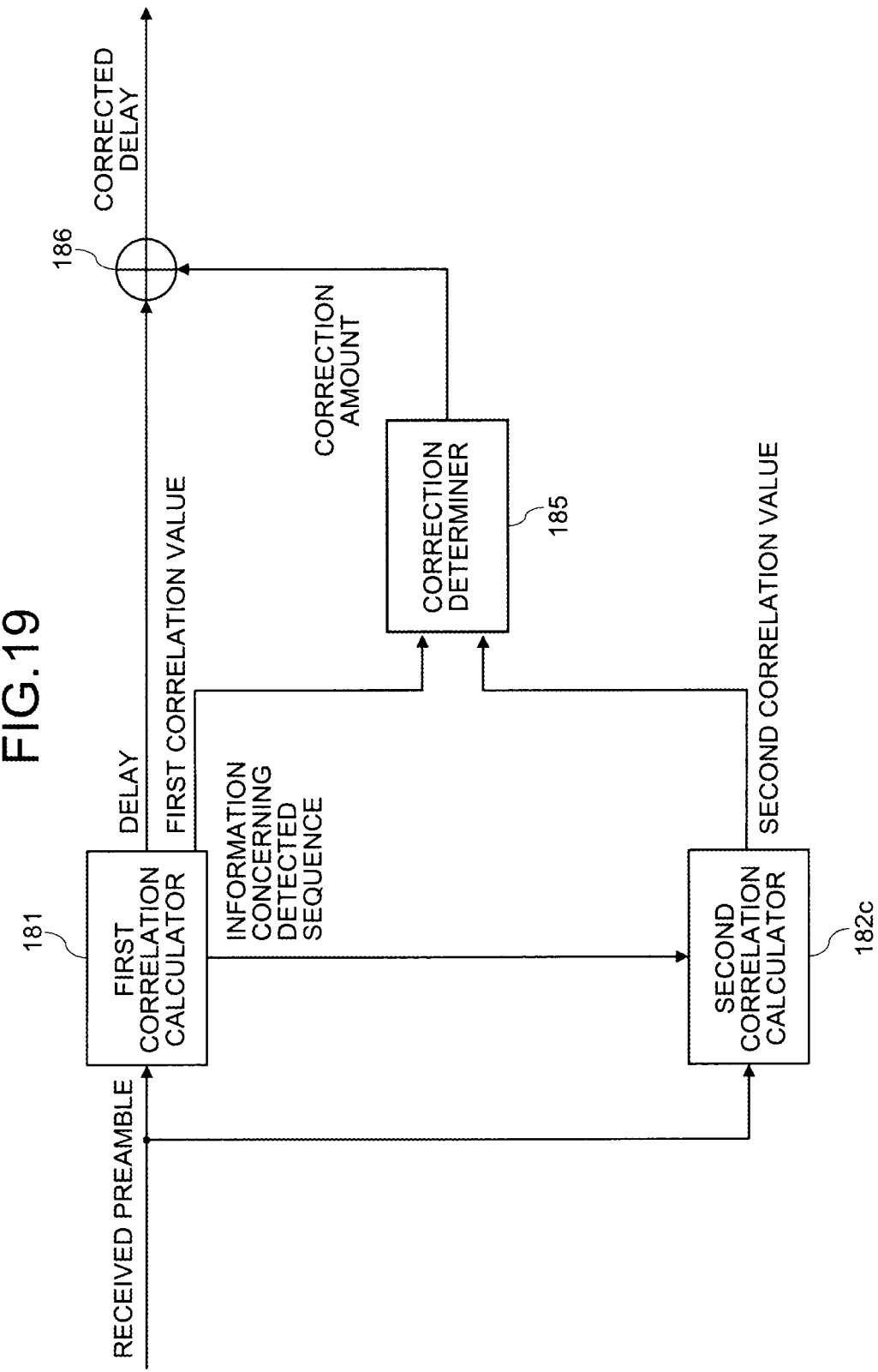

BASE STATION AND SIGNAL PROCESSING METHOD

CROSS REFERENCE TO RELATED APPLICATIONS

This application is a continuation application of International Application PCT/JP2009/006587, filed Dec. 3, 2009, and designating the U.S., the entire contents of which are incorporated herein by reference.

FIELD

The embodiments discussed herein are related to a radio communication technology that synchronizes uplink signals from a mobile station to a base station.

BACKGROUND

In a mobile communication system, for example, when a mobile station transitions from an idle state to a call request procedure, since a dedicated channel has yet to be set, the mobile station uses a random access channel (which corresponds to a physical random access channel of the physical layer and is a common transport channel) and transmits a preamble as a reference signal. The preamble includes a sequence having favorable autocorrelation properties. The preamble is used for uplink signal synchronization between the mobile station and a base station.

A method of uplink signal synchronization between a mobile station and a base station using a preamble will be described with reference to FIG. 1. FIG. 1 is a timing chart depicting preamble transmission and reception timing between a mobile station and a base station. As depicted in FIG. 1, when the uplink signals between the mobile station and the base station are not synchronized, the mobile station receives signals transmitted from the base station at sub-frames (Sub-frame #1, #2, . . . ). The mobile station transmits a preamble to the base station at the time when reception of downlink sub-frames (in FIG. 1, Sub-frame #3) is completed. Assuming the communication depicted in FIG. 1 is performed, at the base station, deviation (delay) of the time at which the preamble is received with respect to the time at which transmission of Sub-frame #3 ends, includes the downlink delay and the uplink delay. The base station, by correlating a sequence included in the received preamble and known sequences, calculates the delay. The calculated delay is fed back to the mobile station and used for uplink signal synchronization.

As the distance between the base station and the mobile station increases, the delay also increases. Thus, under next generation mobile communication standards (Evolved Universal Terrestrial Radio Access (E-UTRA) also called Long Term Evolution (LTE)), as depicted in FIG. 2, multiple preamble formats (Preamble formats: 0, 1, 2, 3) are prepared according to the size of the operating cell. A cyclic prefix (CP) is extracted from the tail of a single, fixed length sequence and can be considered as a portion of the sequence. Under LTE, 64 types of Zadoff-Chu sequences are used for the preamble. A Zadoff-Chu sequence is a constant amplitude zero auto-correlation (CAZAC) sequence having favorable autocorrelation properties.

The mobile station arbitrarily selects any one among the 64 types of Zadoff-Chu sequences, generates a preamble, and transmits the preamble to the base station. The base station correlates the received preamble sequence and the known 64 types of sequences (replicas) and thereby detects the type of sequence used. The base station further autocorrelates the detected sequence and thereby calculates the delay (deviation of preamble reception time). In other words, a sequence received within an interval (hereinafter, sequence detection interval) preliminary set based on a given reference time (e.g., the time at which transmission of a given sub-frame ends) is cyclically shifted according to the delay of preamble reception. Consequently, the base station, by calculating the shift amount (the position where autocorrelation peaks) of the sequence received within the sequence detection interval, calculates the delay and by feeding back the calculated delay to the mobile station, enables the mobile station to synchronize uplink signals.

Further, conventionally in connection with preambles, a method of detecting preamble code in an environment where carrier frequencies between the base station and the mobile station are offset is known.

For examples of conventional technologies, refer to Japanese Laid-Open Patent Publication No. 2008-236744 and 3GPP TS 36.211 V8.7.0: 3rd Generation Partnership Project, Technical Specification Group Radio Access Network, "Evolved Universal Terrestrial Radio Access (E-UTRA); Physical Channels and Modulation" Chapter 5.7 "Physical random access channel".

Under LTE communication standards, a preamble format including 2 fixed length sequences is prescribed (e.g., Preamble format: 3 depicted in FIG. 2). When such a preamble format is used, since the delay may be errantly calculated, a problem arises in that the cell radius (i.e., the distance of the base station and the mobile station) enabling coverage is limited. This problem will be described with reference to FIGS. 3 and 4.

Two mobile stations (MS) #1, MS#2 at respectively different distances from a base station are assumed. In this example, the mobile station MS#2 is assumed to be located farther away from the base station than the mobile station MS#1. FIGS. 3 and 4 are timing charts depicting the timing at which preambles transmitted from the mobile stations MS#1, MS#2 are received at the base station. In FIGS. 3 and 4, time t0 is the time at which transmission of a given sub-frame from the base station to each of the mobile stations ends and is the reference time used to calculate the delay of the preambles. FIG. 4 depicts an example when the mobile station MS#2 is located farther from the base station than in the example depicted in FIG. 3.

In FIGS. 3 and 4, (a) the timing of sub-frame transmission by the base station, from the reference time; (b) the timing of preamble reception at base station, assuming no delay (delay=0); (c) the timing at which the preamble from the mobile station MS#1 is received at the base station; and (d) the timing at which the preamble from the mobile station MS#2 is received at the base station are depicted. The preambles are, for example, signals of Preamble format: 3 under LTE communication standards. In this example, as depicted by (b), the sequence detection interval is set as an interval (time t1 to time t2) that corresponds to the second sequence in a preamble assumed to not be subject to delay.

As depicted by (c) and (d) in FIG. 3, provided that the delays from the mobile stations are within a range that is not that long, differences in the delay are equivalent to differences in the sequence shift amount in the sequence detection interval. In this case, since the sequence shift amounts (the position where autocorrelation peaks) at (c) and (d) in FIG. 3 differ, each delay can be calculated without error.

Next, as depicted in FIG. 4, the delay of the mobile station MS#2 is greater than that in the example depicted in FIG. 3. Consequently, the timing at which the second sequence in the preamble from the mobile station MS#1 is received at the base station and the timing at which the first sequence in the preamble from the mobile station MS#2 is received at the base station, substantially coincide. As a result, in the sequence detection interval, since the sequence shift amounts are recognized as being equivalent by the base station, upon calculation at the base station, the same delay is calculated for the mobile station MS#1 and the mobile station MS#2. Therefore, according to the method of calculating sequence shift amounts in the sequence detection interval, error-free calculation of the delay of a preamble from a mobile station is under the condition that the mobile station is not located such a far distance away from the base station, that a delay corresponding to the reception time of a single sequence arises. To meet this condition, the distance of the mobile station from the base station when the period of time corresponding to the fixed sequence length is 800 µs, such as under LTE, is limited to within 120 km (800 µs/(6.7 µs/km)=120 km) with consideration of uplink and downlink delays.

SUMMARY

According to an aspect of an embodiment, a base station receives from a mobile station, a reference signal that includes two or more sequences of a fixed length and calculates, as time information for uplink signal synchronization at the mobile station, delay with respect to a reference time of the reference signal. The base station includes a first correlator that calculates a first correlation value by correlating known sequences and the reference signal received during a first interval that is set based on the reference time and includes a period equivalent to the fixed length, the first correlator further calculating the delay with respect to the reference time; a second correlator that calculates a second correlation value by correlating the known sequences and the reference signal received during a second interval that includes a period equivalent to the fixed length and is an interval that is different from the first interval; and a corrector that based on a comparison result of the first correlation value and the second correlation value, determines whether to correct the delay calculated by the first correlator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a block diagram of the delay corrector in the base station according to a fourth embodiment.

FIGS. 18 and 19 are block diagrams of examples of the delay corrector in the base station according to a fifth embodiment.

DESCRIPTION OF EMBODIMENTS

Preferred embodiments of the present invention will be explained with reference to the accompanying drawings. A base station according to the embodiments and a signal processing method thereof, together with a mobile communication system (hereinafter, system) that includes the base station will be described.

Figure 5:
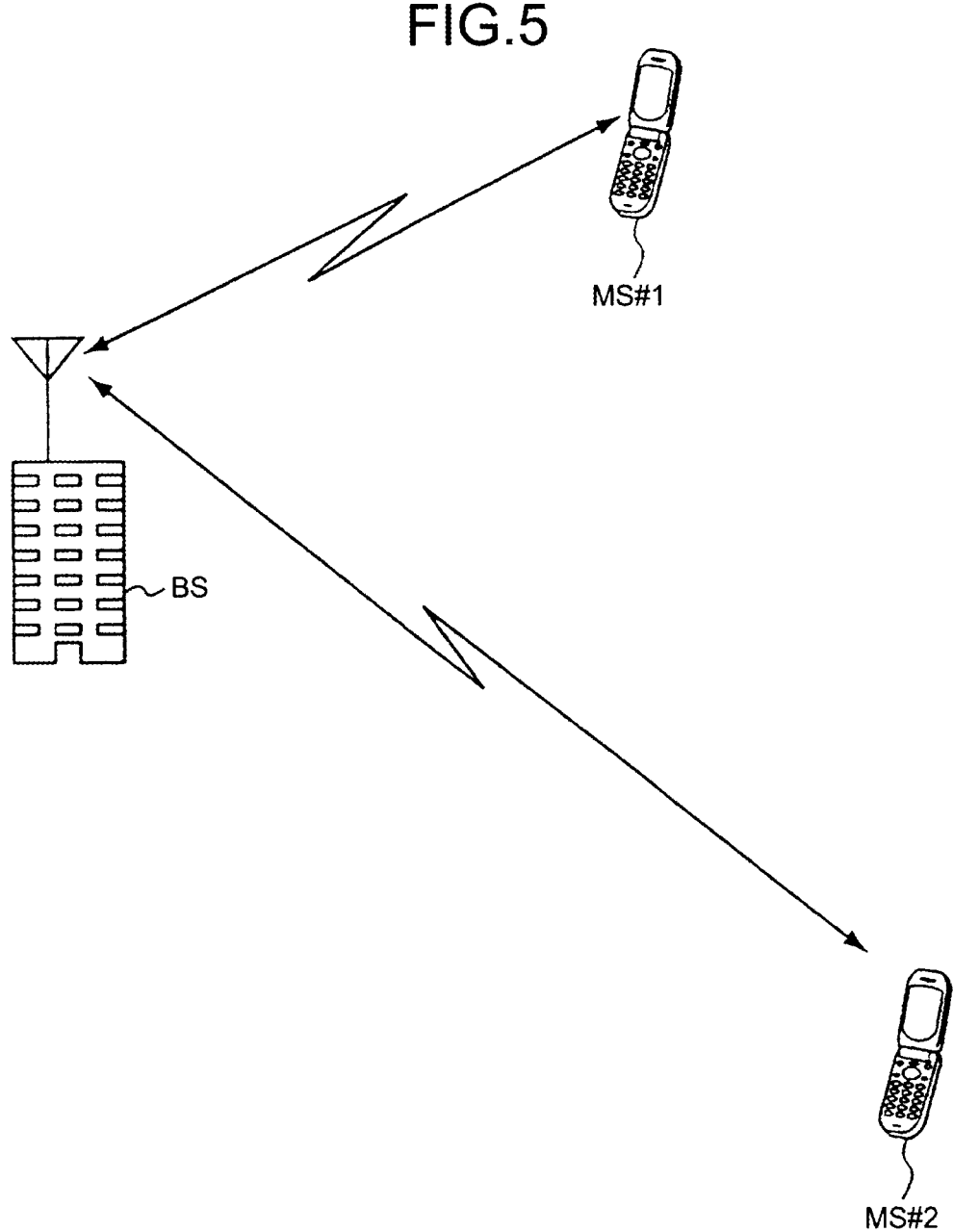
FIG. 5 is a diagram depicting an overview of a system according to an embodiment.

FIG. 5 is a diagram depicting an overview of the system according to a first embodiment. As depicted in FIG. 5, the system includes a base station BS and mobile stations (in FIG. 5, MS#1, MS#2) located within a cell covered by the base station BS. In this example, the mobile station MS#2 is located farther from the base station BS than the mobile station MS#1. In the system, when a dedicated channel has not been set, each mobile station synchronizes a preamble with a downlink signal from the base station BS and transmits the preamble. The base station BS calculates the delay of the preamble from each mobile station, the delay being based on the reference time of a downlink sub-frame, and notifies each mobile station of the respective delay. The mobile stations refer to the notified delay and thereby establish uplink signal synchronization with the base station. Hereinafter, in the description of the embodiments, the delay of preambles from the mobile stations, where each delay is based on a given reference time at the base station, is simply indicated as "delay".

Figure 6:
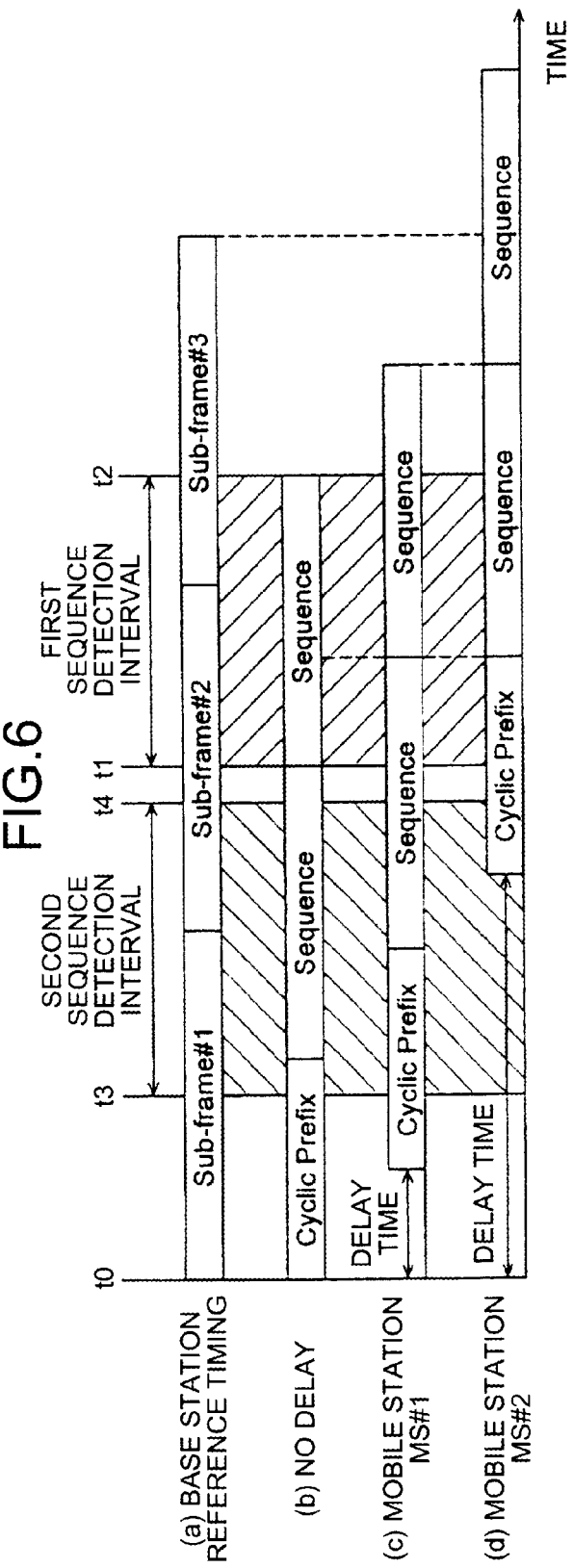
FIG. 6 is a timing chart depicting the timing at which preambles transmitted from the mobile stations are received at the base station according to a first embodiment.

With reference to FIG. 6, the processing of a preamble from a mobile station, by the base station according to the embodiment will be described. FIG. 6 is a timing chart depicting the timing at which preambles transmitted from the mobile stations MS#1, MS#2 are received at the base station. In FIG. 6, (a) the timing of sub-frame transmission by the base station, from the reference time; (b) the timing of preamble reception at the base station, assuming no delay (delay=0); (c) the timing at which the preamble from the mobile station MS#1 is received at the base station; and (d) the timing at which the preamble from the mobile station MS#2 is received at the base station are depicted. The preambles are, for example, signals of Preamble format: 3 under LTE communication standards and with consideration of CP, essentially include 2 or more fixed length sequences.

Here, in the base station of the present embodiment, for example, a first sequence detection interval (first interval) is set as an interval (time t1 to time t2) that corresponds to the second sequence in a preamble that is not subject to delay and a second sequence detection interval is set at a time (time t3 to time t4) occurring sooner than the first sequence detection interval. Here, the second sequence detection interval, similar to the first sequence detection interval, is an interval of a length corresponding to the fixed sequence length.

Each mobile station, as a sequence for which autocorrelation properties are favorable, for example, selects any one among 64 types of Zadoff-Chu sequences, generates a preamble, and transmits the preamble to the base station. The base station correlates the sequence of the preambles arbitrarily selected at the mobile stations and the known 64 types of sequences (replicas) to thereby detect the used sequence types. The base station, among the received preambles, further calculates the delay of the signal of the first sequence detection interval by autocorrelating the detected sequence thereof.

Here, as depicted in FIG. 6, the delay of the preamble from the mobile station MS#2 is assumed to be longer than that of the preamble from the mobile station MS#1, by an amount corresponding to a single sequence (an amount of time corresponding to the fixed length). In other words, the timing at which the second sequence in the preamble from the mobile station MS#1 is received at the base station and the timing at which the first sequence of the preamble from the mobile station MS#2 is received at the base station are assumed to substantially coincide. In such a case, assuming that autocorrelation is performed only for the first sequence detection interval, among the preambles received from the mobile stations MS#1, MS#2, the cyclic shift amounts of the sequences in the first sequence detection interval are recognized to be equivalent. Thus, upon calculation at the base station, the same delay is calculated for the mobile station MS#1 and the mobile station MS#2 (errant calculation of the delay).

In the base station according to the present embodiment, the second sequence detection interval (second interval) is set to perform autocorrelation in an interval that is independent of the first sequence detection interval (first interval) to thereby prevent errant calculation of the delay. As an example of the second sequence detection interval depicted in FIG. 6, the second sequence detection interval is set to occur before the first sequence detection interval. Consequently, in FIG. 6, the preamble from the mobile station MS#1 is included in the entire second sequence detection interval, whereas the preamble from the mobile station MS#2 is only included in a portion of the second sequence detection interval. Therefore, the peak value of autocorrelation for the signal that is in the preamble from the mobile station MS#1 and received during the second sequence detection interval is a high value, whereas the peak value of autocorrelation for the signal that is in the preamble from the mobile station MS#2 and received during the second sequence detection interval is a low value. From a different perspective, with respect to the preamble received from the mobile station MS#1, the peak value of autocorrelation for the signal received during the first sequence detection interval and the peak value of autocorrelation for the signal received during the second sequence detection interval do not differ greatly. In contrast, with respect to the preamble received from the mobile station MS#2, the peak value of autocorrelation for the signal received during the second sequence detection interval is low compared to the peak value of autocorrelation for the signal received during the first sequence detection interval.

Thus, in the base station according to the present embodiment, with respect to the preambles received from the mobile stations, a comparison result of autocorrelation values (peak values) obtained using the first sequence detection interval and the second sequence detection interval or an evaluation result of the magnitude of autocorrelation values (peak values) obtained using the second sequence detection interval are used to correct the delay calculated using the first sequence detection interval. For example, if the autocorrelation values obtained using the first sequence detection interval and the second sequence detection interval differ greatly (such as with the mobile station MS#2 in FIG. 6), the delay calculated using the first sequence detection interval is corrected by adding a period of time equivalent to a single sequence, thereby preventing errant calculation of the delay of the preamble received from a mobile station. By preventing errant calculation of the delay, even if the delay of a preamble is longer than the period of time corresponding to a single sequence, the delay can be correctly calculated. Consequently, by providing the second sequence detection interval, the distance between a base station and a mobile station, at which uplink signal synchronization can be established therebetween, can be increased.

Figure 7:
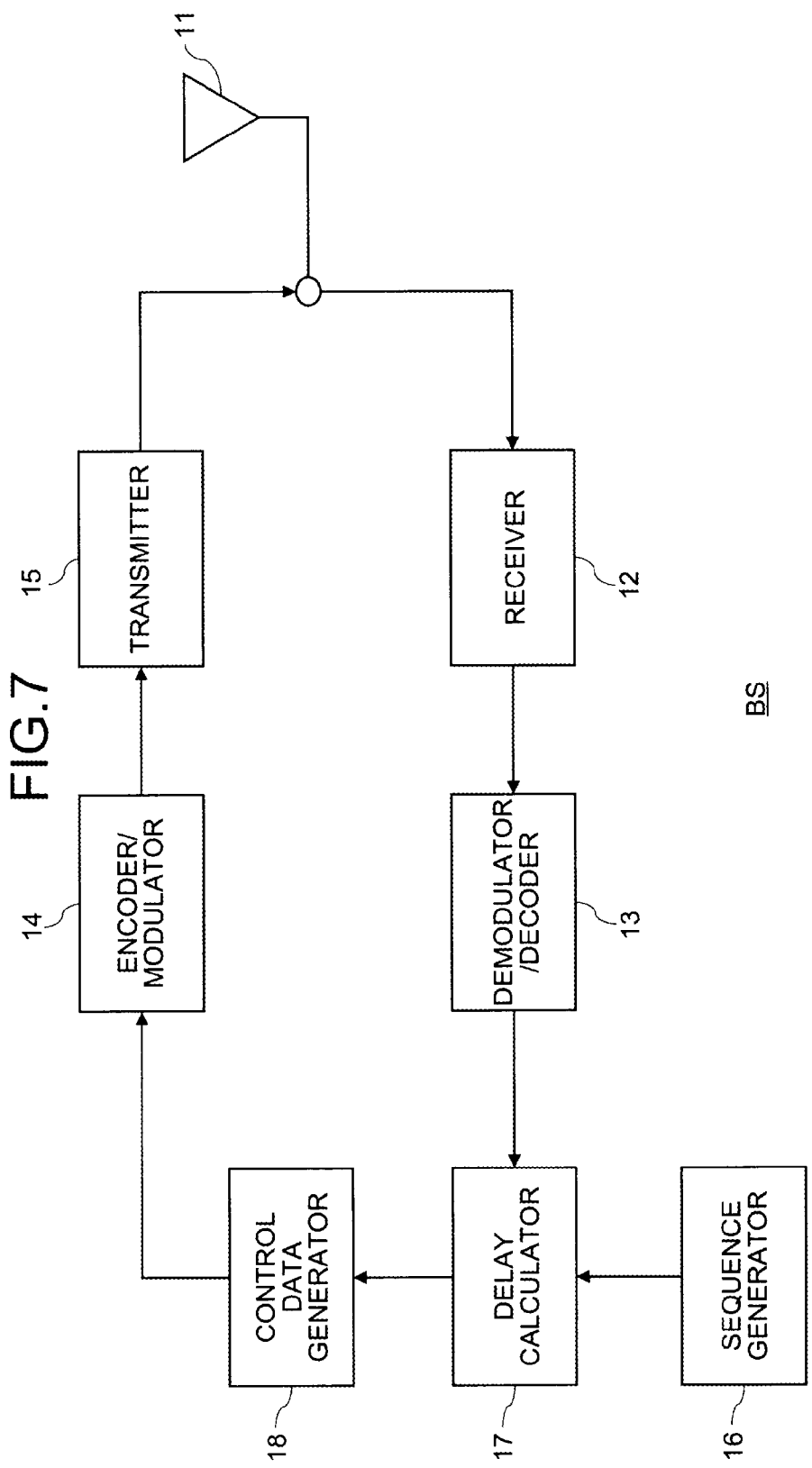
FIG. 7 is a block diagram of a configuration of the base station according to the first embodiment.
Figure 8:
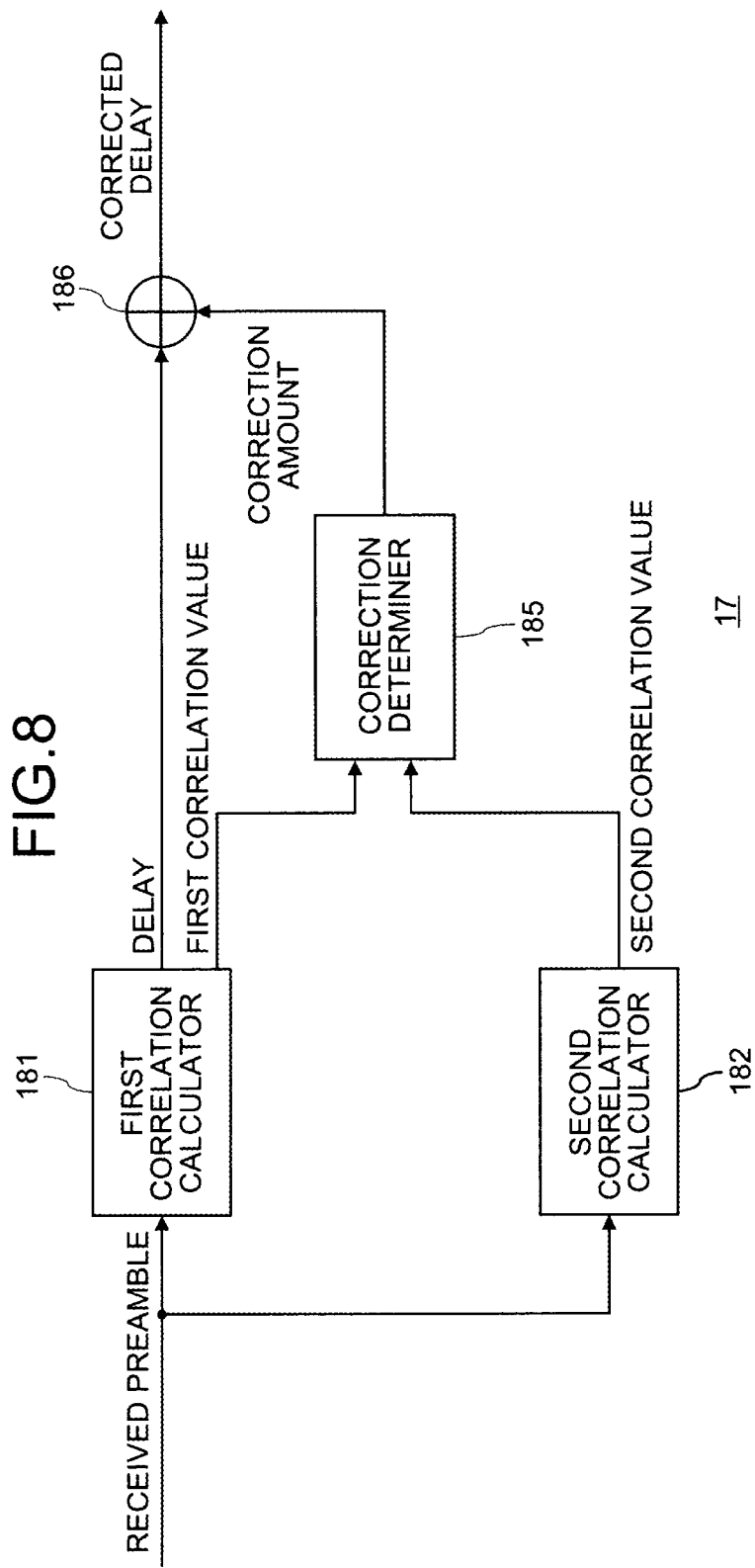
FIG. 8 is a block diagram of a delay corrector in the base station according to the first embodiment.

Configuration of the base station according to the present embodiment will be described with reference to FIGS. 7 and 8. FIG. 7 is a block diagram of a configuration of the base station according to the embodiment. FIG. 8 is a block diagram of a delay corrector in the base station depicted in FIG. 7. As depicted in FIG. 7, the base station according to the embodiment includes an antenna 11, a receiver 12, a demodulator/decoder 13, an encoder/modulator 14, a transmitter 15, a sequence generator 16, a delay calculator 17, and a control data generator 18.

The receiver 12 includes a band-limiting filter, a low noise amplifier, a local frequency oscillator, a quadrature demodulator, an automatic gain control (AGC) amplifier, an A/D converter, etc. The receiver 12 down converts a signal (RF signal) received by the antenna 11, from a radio frequency to a baseband frequency. The baseband signal obtained by the receiver 12 is demodulated and decoded by the demodulator/decoder 13.

A preamble is extracted from the received data that has been demodulated and decoded by the demodulator/decoder 13, and is provided to the delay calculator 17. The delay calculator 17, calculates the delay ("delay" in FIG. 6) of the preamble from each mobile station, the delay being based on a given reference time. In the calculation of the preamble delays, detection of a sequence included in the preambles is necessary. Consequently, known sequences (replicas; e.g., the 64 types of Zadoff-Chu sequences) generated based on a given formula (for example, in the case of LTE, a formula defined in 3GPP TS 36.211 V8.7.0: 3rd Generation Partnership Project, Technical Specification Group Radio Access Network, "Evolved Universal Terrestrial Radio Access (E-UTRA); Physical Channels and Modulation" Chapter 5.7 "Physical random access channel") are generated by the sequence generator 16 and provided to the delay calculator 17. Configuration of the delay calculator 17 will be described hereinafter.

The control data generator 18 generates control data so as to associate the delays calculated for each mobile station and the control data for each mobile station. The encoder/modulator 14 performs correction encoding processing and modulation with respect to the control data. The transmitter 15 includes a digital to analog (D/A) converter, a local frequency oscillator, a mixer, a power amplifier, a filter, etc., and after up converting a signal to be transmitted (baseband signal) from a baseband frequency to a radio frequency, etc., transmits the signal from the antenna 11.

The delay calculator 17 will be described with reference to FIG. 8. The delay calculator 17 includes a first correlation calculator 181, a second correlation calculator 182, a correction determiner 185, and an adder 186. When processing by the delay calculator 17 is performed, received preambles are assumed to be stored in a non-depicted buffer. The first correlation calculator 181 correlates the sequence that is in the preamble obtained by the demodulator/decoder 13 and received during the first sequence detection interval (see FIG. 6) and the known 64 types of sequences (replicas), and thereby detects the used sequence type. The first correlation calculator 181 further calculates the delay by calculating the cyclic shift amount (the position where autocorrelation peaks) of the detected sequence. The peak autocorrelation value calculated by the first correlation calculator 181 is provided to the correction determiner 185 as a first correlation value. The second correlation calculator 182 correlates the sequence that is in the preamble obtained by the demodulator/decoder 13 and received during the second sequence detection interval (see FIG. 6) and the known 64 types of sequences (replicas), and thereby detects the used sequence type. The second correlation calculator 182 further calculates the autocorrelation value (peak value) of the detected sequence. The peak autocorrelation value calculated by the second correlation calculator 182 is provided to the correction determiner 185 as a second correlation value.

The correction determiner 185, according to a comparison result of the first correlation value and the second correlation value, determines whether to correct the delay calculated by the first correlation calculator 181. As described with reference to FIG. 6, when the preamble from a mobile station is delayed by a period of time exceeding that corresponding to a single sequence length, no more than a portion of the sequence of the preamble is received during the second sequence detection interval. In this case, the second correlation value obtained by the second correlation calculator 182 is a value that is small (low correlation) compared to the first correlation value. Thus, when the correction determiner 185 compares the first correlation value and the second correlation value and determines that the preamble from the mobile station is delayed by a period of time exceeding that corresponding to a single sequence length, the correction determiner 185 determines that the delay obtained by the first correlation calculator 181 is to be corrected.

Various methods of comparing the first correlation value and the second correlation value may be considered. One preferable method is to determine that the delay is to be corrected if the ratio of the first correlation value and the second correlation value exceeds a threshold. In other words, since the obtained first correlation value and second correlation value vary according to the level of the signal received from the mobile station, use of the ratio of the first correlation value and the second correlation value is preferable. For example, in the example depicted in FIG. 6, for the mobile station MS#1, the ratio of the first correlation value to the second correlation value is substantially 1 (first correlation value=second correlation value) and for the mobile station MS#2, the ratio is a small value (nearly 0). Therefore, by setting a suitable threshold (0<threshold<1) with respect to the ratio of the first correlation value to the second correlation value, the necessity of delay correction can be easily determined. The method of comparing the first correlation value and the second correlation value is not limited to using a ratio of the first correlation value and the second correlation value. As another method, a method of comparing the difference of the first correlation value and the second correlation value with a threshold may be used. Further, a method of comparing only the second correlation value to a threshold may be adopted.

The correction determiner 185, upon determining that the delay is not to be corrected, outputs to the adder 186, "0" as a correction amount. Consequently, in effect, the delay calculated by the first correlation calculator 181 is not corrected. The correction determiner 185, upon determining that the delay is to be corrected, outputs to the adder 186 and as a correction amount, a period of time that corresponds to a single sequence length. Consequently, the corrected delay is the delay calculated by the first correlation calculator 181 to which a "period of time corresponding to a single sequence length" (period of time equivalent to the fixed sequence length) is added.

Figure 9:
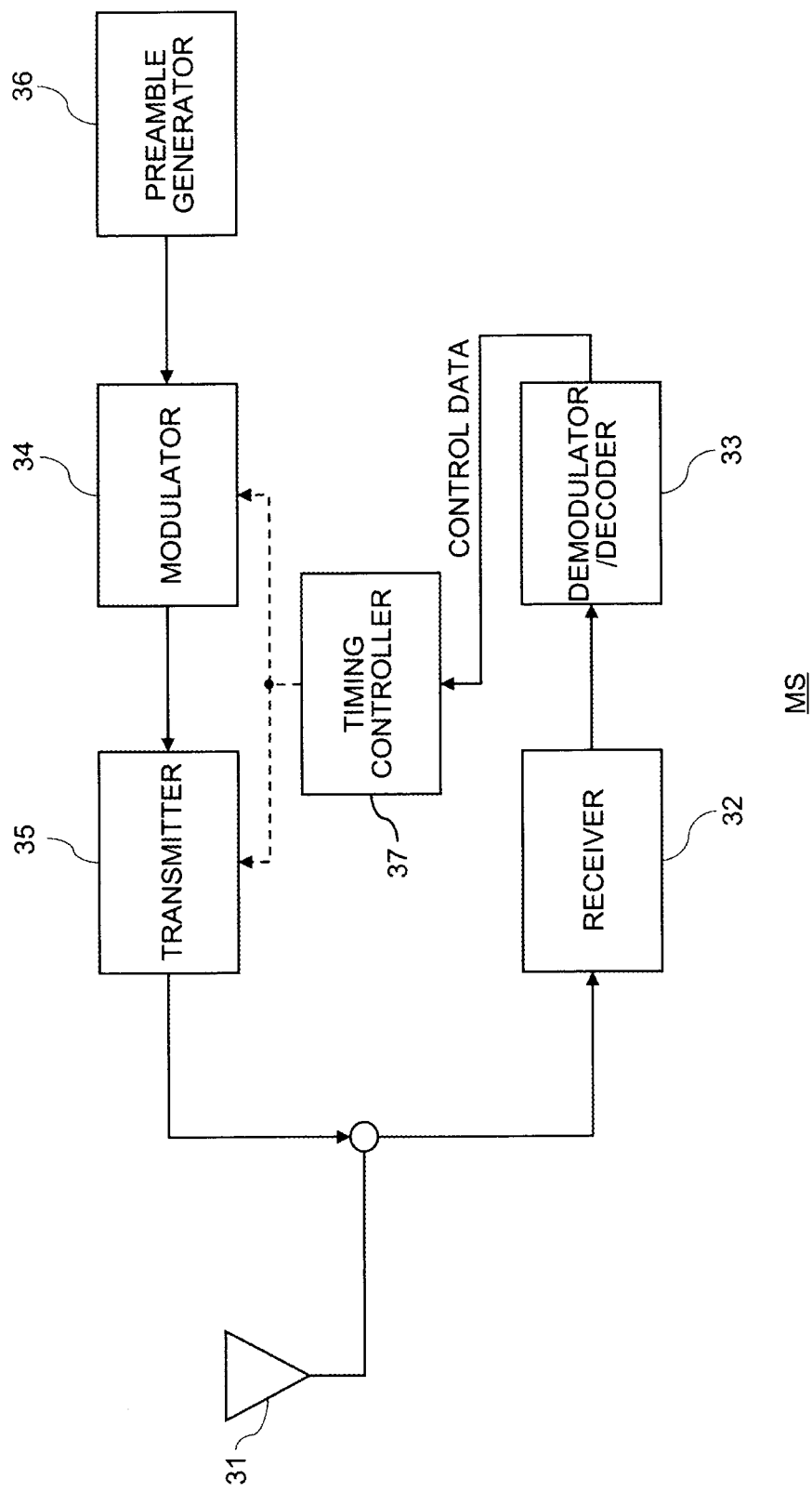
FIG. 9 is a block diagram of the mobile station according to the embodiment.

Configuration of the mobile station according to the present embodiment will be described with reference to FIG. 9. FIG. 9 is a block diagram of the mobile station according to the embodiment. As depicted in FIG. 9, the mobile station includes an antenna 31, a receiver 32, a demodulator/decoder 33, a modulator 34, a transmitter 35, a preamble generator 36, and a timing controller 37.

The receiver 32 includes a band-limiting filter, a low noise amplifier, a local frequency oscillator, a quadrature demodulator, an AGC amplifier, an A/D converter, etc. The receiver 32 down converts a signal (RF signal) received by the antenna 31, from a radio frequency to a baseband frequency. The baseband signal obtained by the receiver 32 is demodulated and decoded by the demodulator/decoder 33. Control data is extracted from the data that has been demodulated and decoded by the demodulator/decoder 33, and is provided to the timing controller 37. The control data includes information concerning the delay calculated by the base station.

Figure 1:
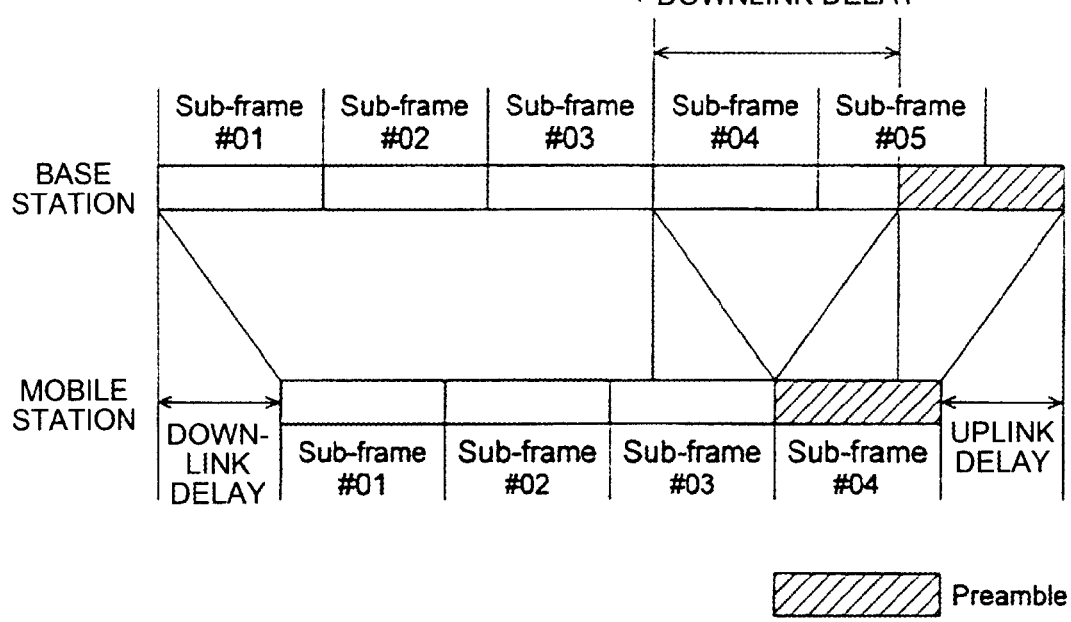
FIG. 1 is a timing chart depicting preamble transmission and reception timing between a mobile station and a base station.
Figure 2:
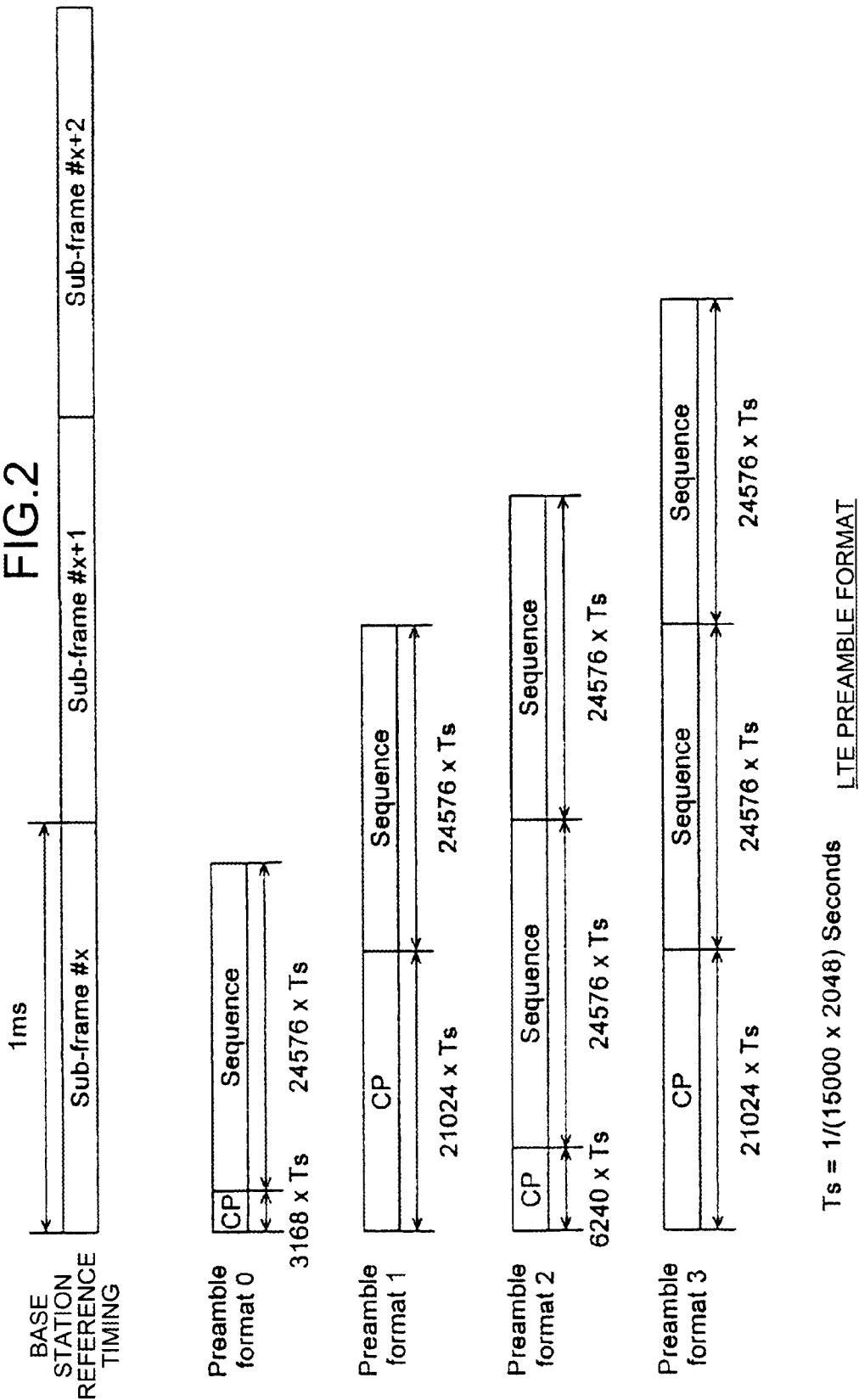
FIG. 2 depicts LTE preamble formats.
Figure 3:
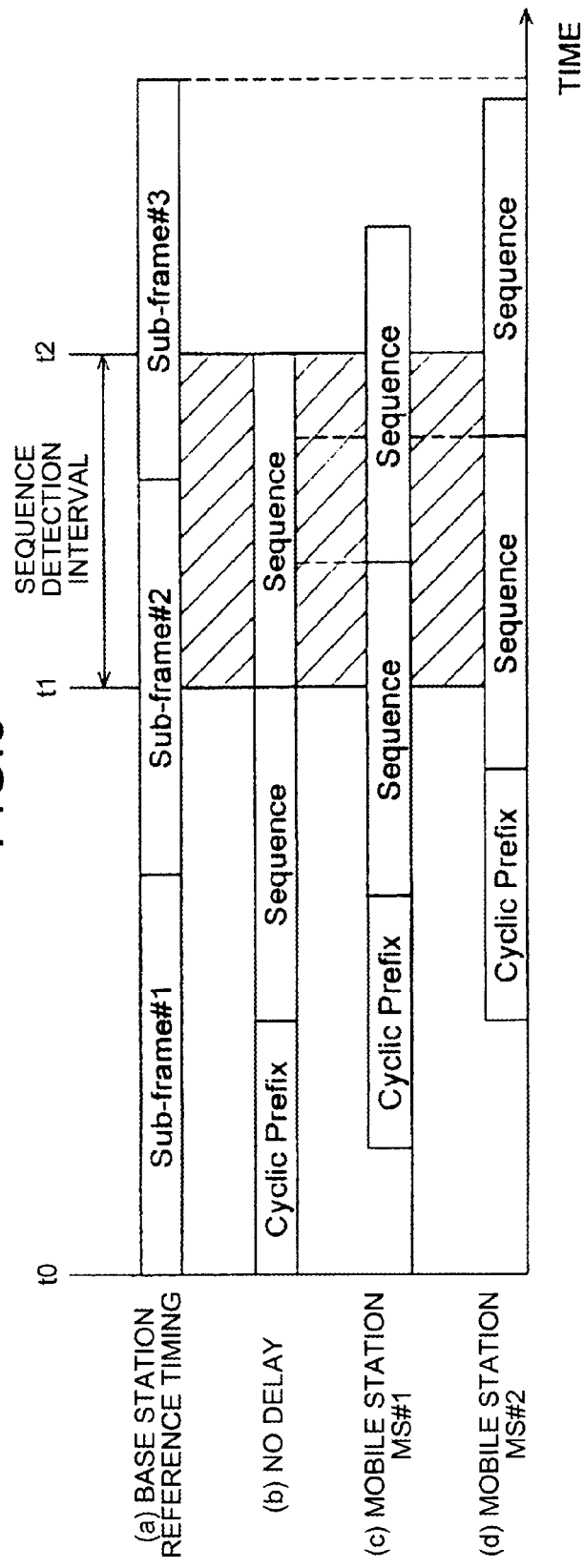
FIGS. 3 and 4 are timing charts depicting the timing at which preambles transmitted from mobile stations are received at the base station.
Figure 4:
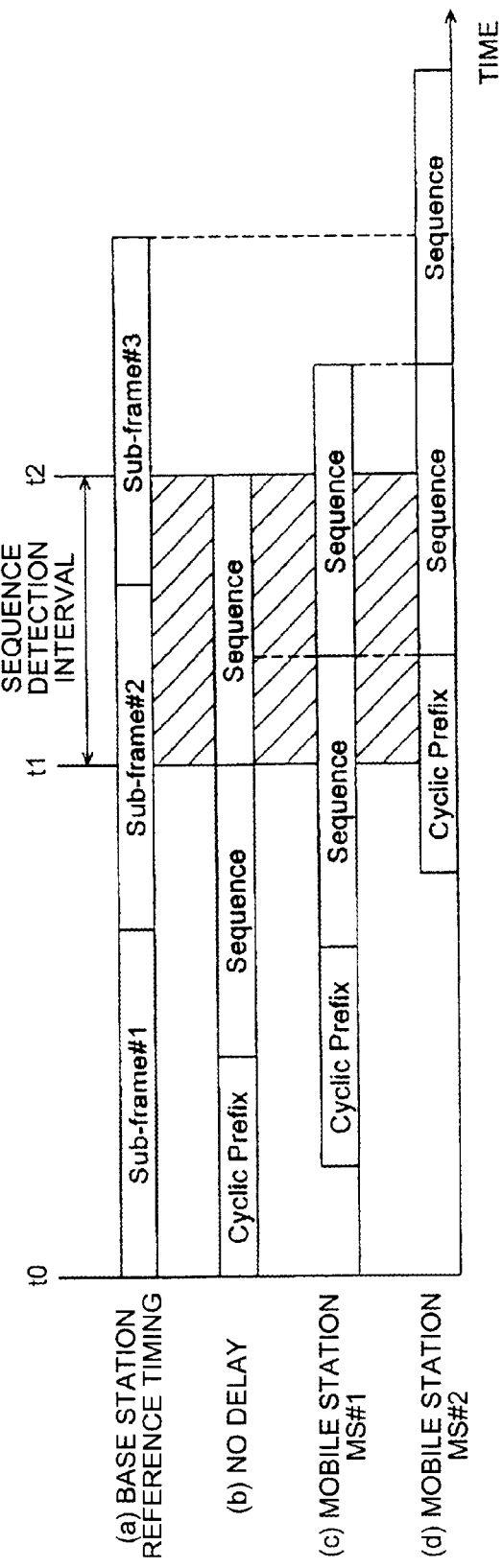

The preamble generator 36 generates a preamble according to a preliminarily specified preamble format. For example, in the case of LTE, a preamble is generated according to any one of the preamble formats depicted in FIG. 2. Here, as a sequence included in the preamble, for example, any sequence among 64 types of Zadoff-Chu sequences having favorable autocorrelation properties is arbitrarily selected.

The modulator 34 modulates the preamble generated by the preamble generator 36, together with other data to be transmitted. The transmitter 35 includes a D/A converter, a local frequency oscillator, a mixer, a power amplifier, a filter, etc., and after up converting the signal to be transmitted (baseband signal) from a baseband frequency to a radio frequency, etc., the transmitter 35 transmits the signal from the antenna 31.

The timing controller 37 refers to the delay information in the control data provided by the demodulator/decoder 33 and controls the processing timing of the modulator 34 and the transmitter 35. Consequently, the transmission timing of uplink signals to the base station is adjusted by the delay amount and uplink signal synchronization can be established between the mobile station and the base station.

Figure 10:
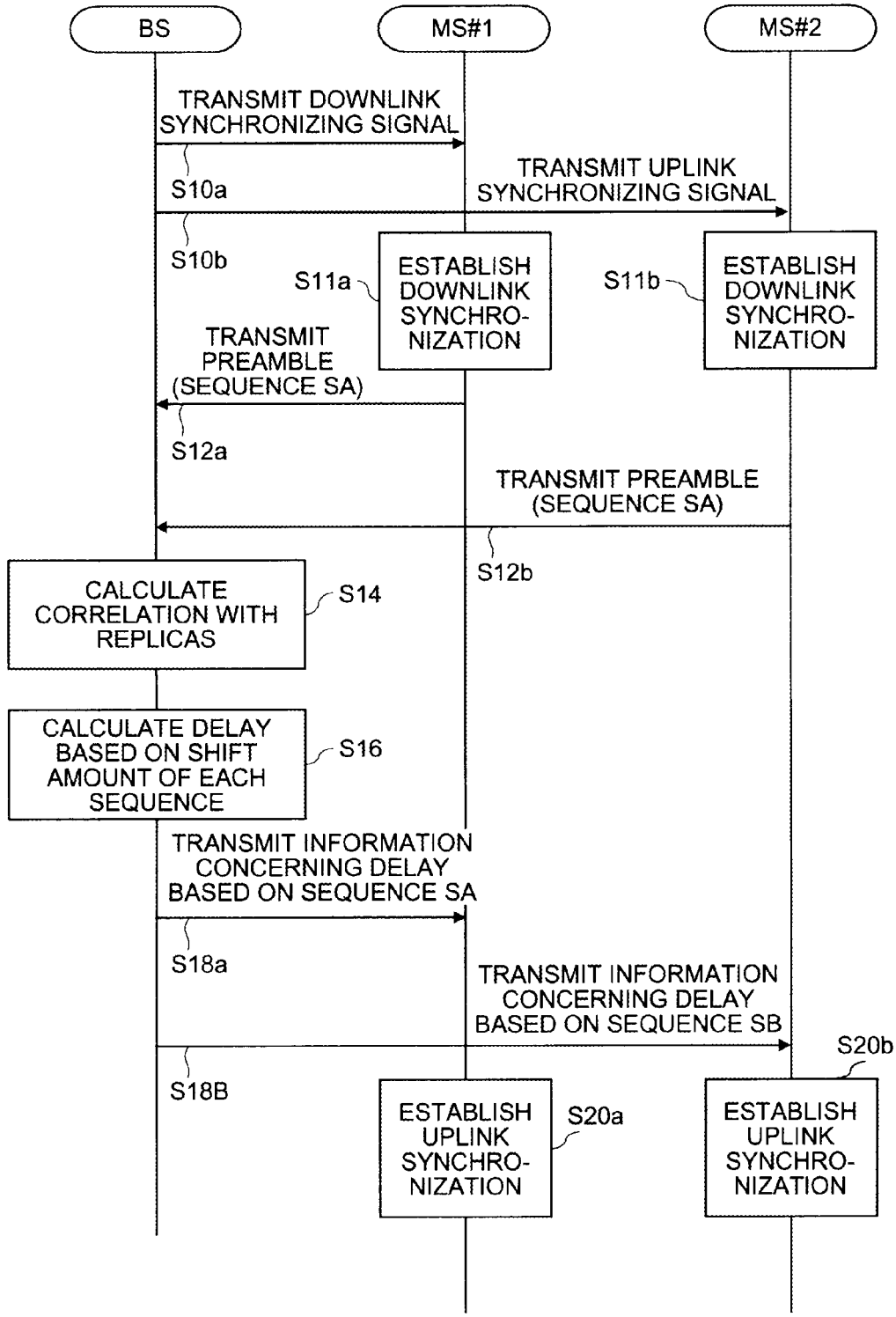
FIG. 10 is a sequence chart depicting the overall operation flow of the system according to the first embodiment.

Overall operation of the system according to the embodiment will be described with reference to FIG. 10. FIG. 10 is a sequence chart depicting the overall operation flow of the system according to the embodiment. FIG. 10 depicts operations when downlink signal synchronization and uplink signal synchronization are established between a base station (BS) and 2 mobile stations (MS#1, MS#2) respectively at different locations.

The base station (BS) transmits a downlink synchronizing signal to the 2 mobile stations (MS#1, MS#2) (steps S10a, S10b), whereby downlink signal synchronization is established at the mobile stations (steps S11a, S11b). The mobile stations, respectively transmit to the base station at the time when the reception of a downlink sub-frame has ended, a preamble generated by the preamble generator 36 (steps S12a, S12b). Here, the preamble generators 36 of the mobile stations generate the preambles according to a preliminarily specified preamble format and, for example, include any sequence arbitrarily selected from among the 64 types of Zadoff-Chu sequences. In FIG. 10, the sequence of the preamble transmitted from the mobile station MS#1 is assumed to be SA and the sequence of the preamble transmitted from the mobile station MS#2 is assumed to be SB.

The base station correlates the preamble sequences arbitrarily selected by the mobile stations and the known 64 types of sequences (replicas) (step S14) and thereby, detects the sequence types (SA, SB) used by the mobile stations. The base station, with respect to the signals that are in the preambles received from the mobile stations and received during the first sequence detection interval, further calculates the delays by autocorrelating the sequences detected at step S14 (step S16). In the present embodiment, the delay is corrected as necessary.

For example, the first correlation calculators 181 of the mobile stations, with respect to the preambles received during the first sequence detection interval commencing from a reference time (e.g., time t1 depicted in FIG. 6), detect the sequence types thereof and correlate the detected sequence type and known sequence types. As a result, the first correlation values (peak values after shifting) are calculated and each preamble delay with respect to the reference time is calculated, each delay being according to the sequence shift amount at the time of correlation calculation. The second correlation calculators 182 of the mobile stations, with respect to the preamble received during the second sequence detection interval, which differs from the first sequence detection interval, detect the sequence types thereof and correlate the detected sequence types and the known sequence types and thereby similarly calculate the second correlation values (peak values after shifting). The correction determiner 185, based on a comparison result of the first correlation value and the second correlation value, determines whether the delay calculated by the first correlation calculator 181 is to be corrected. If the delay is to be corrected, the adder 186 corrects the delay calculated by the first correlation calculator 181 by adding to the delay, a period of time that corresponds to a single sequence length.

The base station generates control data that includes information concerning the corrected delay calculated at step S16 and transmits the control data to the mobile stations (steps S18a, S18b). At the mobile stations, the timing controllers 37, based on the delay in the received control data, adjust the timing of transmission to the base station and thereby, establish uplink signal synchronization with the base station (steps S20a, S20b).

As described, in the base station according to the present embodiment, with respect to a preamble received from a mobile station, whether the delay calculated using the first sequence detection interval is to be corrected is determined using an autocorrelation value obtained using the second sequence detection interval, which is set as an interval different from the first sequence detection interval. Consequently, even if the preamble delay is longer than the period of time corresponding to a single sequence, the delay is correctly calculated. Thus, according to the base station of the present embodiment, the distance between a base station and a mobile station, at which uplink signal synchronization can be established therebetween, can be increased.

Concerning the base station of the present embodiment, a signal processing method is herein disclosed that includes calculating a first correlation value by correlating known sequences with a preamble received during the first sequence detection interval that is set based on a reference time (e.g., time t1 depicted in FIG. 6) and further calculating the delay of the preamble with respect to the reference time; calculating a second correlation value by correlating the known sequences with the preamble received during the second sequence detection interval, which is different from the first sequence detection interval; and according to a comparison result of the first correlation value and the second correlation value, determining whether the calculated delay is to be corrected.

Figure 11:
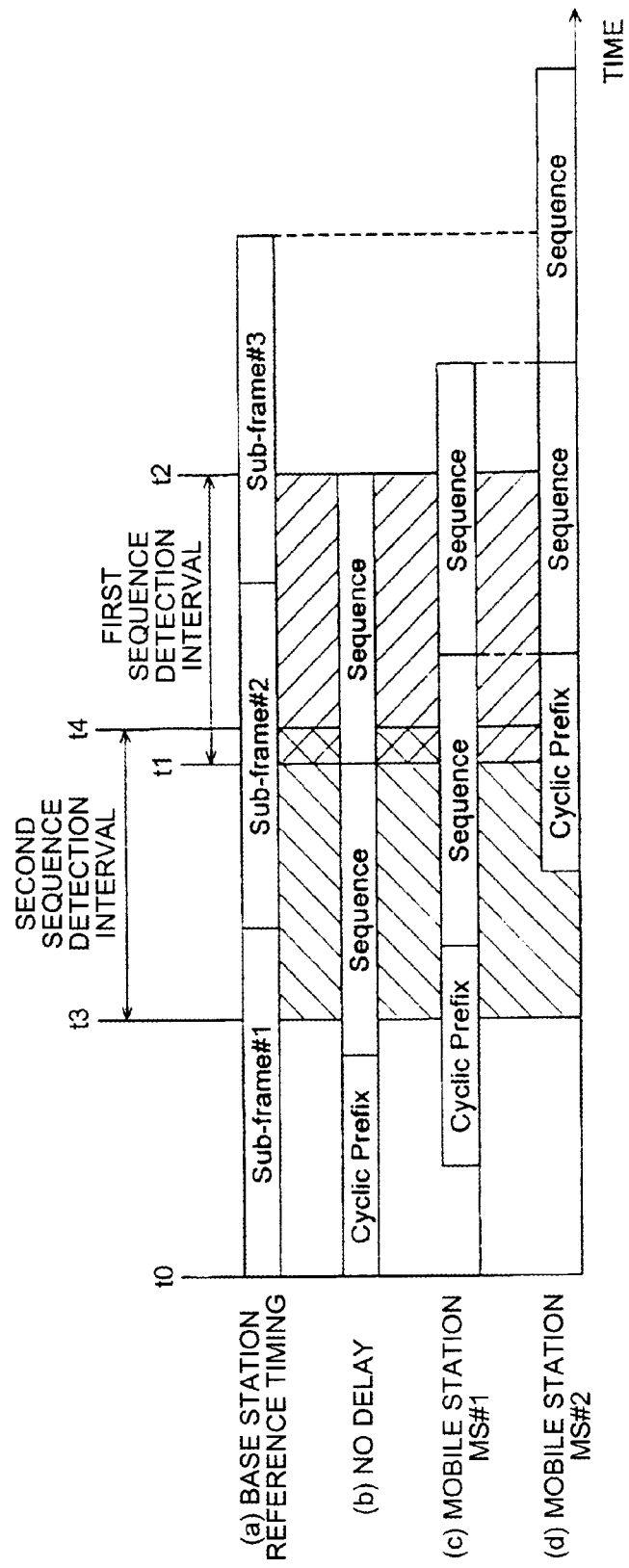
FIGS. 11 and 12 are timing charts depicting setting examples of the second sequence detection interval.

A first modification example of the second sequence detection interval setting will be described. In the present embodiment, one example concerning the setting of the second sequence detection interval is depicted in FIG. 6. In FIG. 6, although the second sequence detection interval is provided to occur before the first sequence detection interval with a slight gap therebetween, the second sequence detection interval is not limited hereto. As depicted in FIG. 11, the second sequence detection interval may partially overlap the first sequence detection interval. Even if the first sequence detection interval and the second sequence detection interval partially overlap, for example, as in FIG. 11, the preamble from the mobile station MS#2 is still only included in a portion of the second sequence detection interval, enabling the need for correction of the delay that has been calculated using the first sequence detection interval to be determined. In the overlapping portion (between times t1 and t4) in FIG. 11, the correlation calculation result for the second sequence detection interval cannibalizes the correlation calculation result for the first sequence detection interval, enabling the overall volume of calculations to be reduced.

Figure 12:
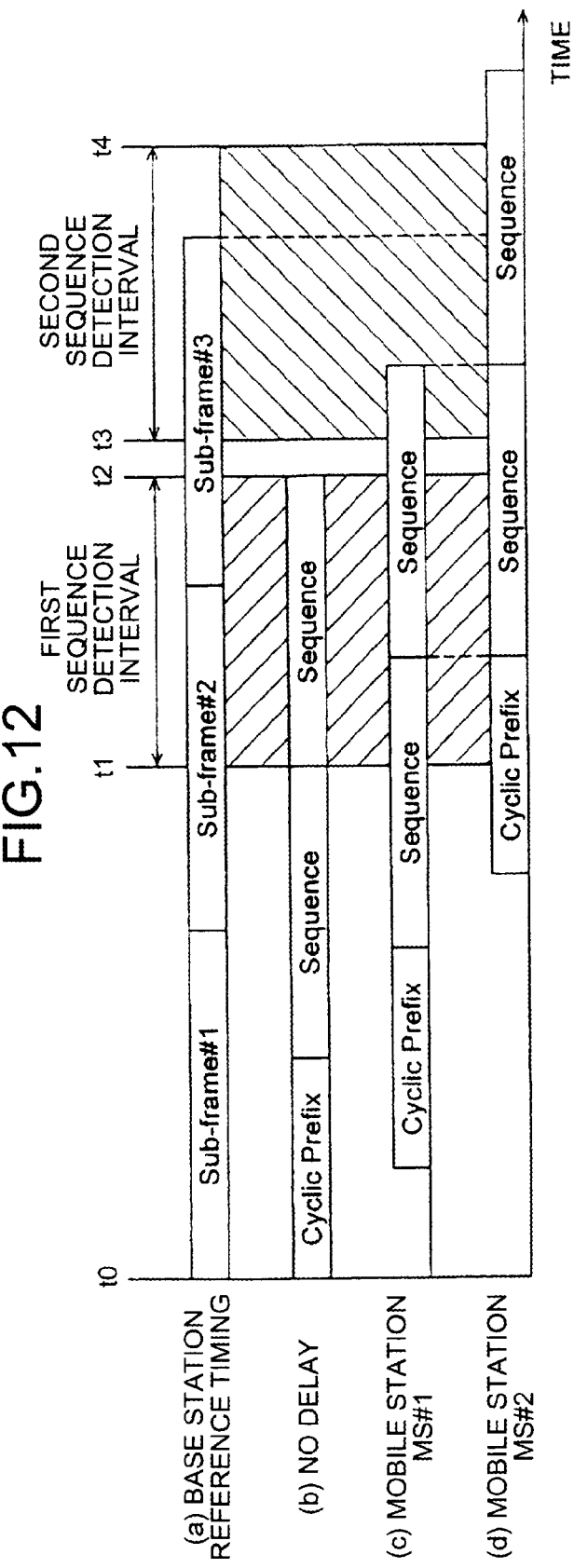

A second modification example of the second sequence detection interval setting will be described. Concerning the setting of the second sequence detection interval, as depicted in FIG. 12, the second sequence detection interval may be provided to occur after the first sequence detection interval. In FIG. 12, the preamble from the mobile station MS#2 is included in the entire second sequence detection interval, whereas the preamble from the mobile station MS#1 is included in only a portion of the second sequence detection interval. Consequently, the peak value of autocorrelation for the signal that is in the preamble from the mobile station MS#2 and received during the second sequence detection interval is a high value, whereas the peak value of autocorrelation for the signal that is in the preamble from the mobile station MS#1 and received during the second sequence detection interval is a low value. From a different perspective, with respect to the preamble received from the mobile station MS#2, the peak value of autocorrelation for the signal received during the first sequence detection interval and the peak value of autocorrelation for signal received during the second sequence detection interval do not differ greatly. In contrast, with respect to the preamble received from the mobile station MS#1, the peak value of autocorrelation for the signal received during the second sequence detection interval is extremely low compared to the peak value of autocorrelation for the signal received during the first sequence detection interval. Therefore, similar to the example illustrated in the present embodiment (FIG. 6), a comparison result of the autocorrelation values (peak values) obtained using the first sequence detection interval and the second sequence detection interval or an evaluation result concerning the magnitude of autocorrelation values (peak values) obtained using the second sequence detection interval can be used to determine the necessity of correcting the delay calculated using the first sequence detection interval. In FIG. 12, although a slight gap is set between the first sequence detection interval and the subsequent second sequence detection interval, similar to the example in FIG. 11, the second sequence detection interval may partially overlap the first sequence detection interval.

Figure 13:
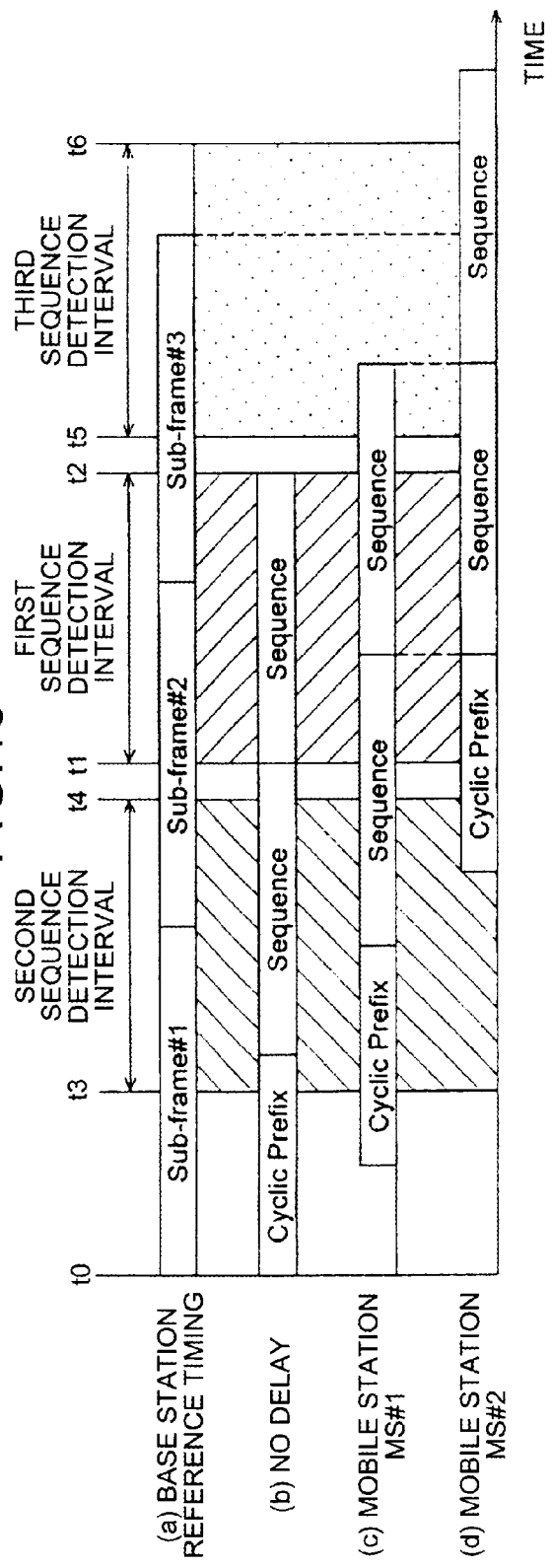
FIG. 13 is a timing chart depicting a setting example of sequence detection intervals at the base station according to a second embodiment.

A second embodiment will be described. The setting of the sequence detection interval in the present embodiment will be described with reference to FIG. 13. As depicted in FIG. 13, in the present embodiment, the second sequence detection interval is set so as to occur before the first sequence detection interval and a third sequence detection interval is set so as to occur after the first sequence detection interval. Processing of the received preamble in the second sequence detection interval is identical to that in the first embodiment. In the present embodiment, the processing of the received preamble in the third sequence detection interval is identical to the processing in the second sequence detection interval. In other words, an autocorrelation value (peak value) in the third sequence detection interval is calculated as a third correlation value, for the received preamble.

In the setting example for the third sequence detection interval depicted in FIG. 13, the third sequence detection interval is set so as to occur after the first sequence detection interval. Thus, in FIG. 13, the preamble from the mobile station MS#1 is included in the entire second sequence detection interval and only in a portion of the third sequence detection interval. On the other hand, the preamble from the mobile station MS#2 is included in only a portion of the second sequence detection interval and is included in the entire third sequence detection interval. As a result, with respect to the preamble from the mobile station MS#1, the peak value (second correlation value) of autocorrelation for the signal that is received during the second sequence detection interval is a high value and the peak value (third correlation value) of autocorrelation for the signal that is received during the third sequence detection interval is a low value. On the other hand, with respect to the preamble received from the mobile station MS#2, the peak value (second correlation value) of the signal received during the second sequence detection interval is a low value and the peak value (third correlation value) of autocorrelation for the signal received during the third sequence detection interval is a high value.

Thus, in the base station of the present embodiment, with respect to the preamble received from the mobile station, in addition to a comparison result of the autocorrelation values (peak values) obtained using the first sequence detection interval and the second sequence detection interval, a comparison result of the autocorrelation values (peak values) obtained using the first sequence detection interval and the third sequence detection interval are considered in determining whether delay correction is necessary. For example, delay correction is determined to be necessary on the conditions that the ratio of second correlation value to first correlation value (peak value of autocorrelation for the signal in the first sequence detection interval) is low and the ratio of third correlation value to the first correlation value is substantially 1 (high value). Consequently, the accuracy of determining the need for correction of the delay is improved compared to the first embodiment.

In FIG. 13, the first sequence detection interval and the second sequence detection interval may partially overlap; and the first sequence detection interval and the third sequence detection interval may partially overlap.

Figure 14:
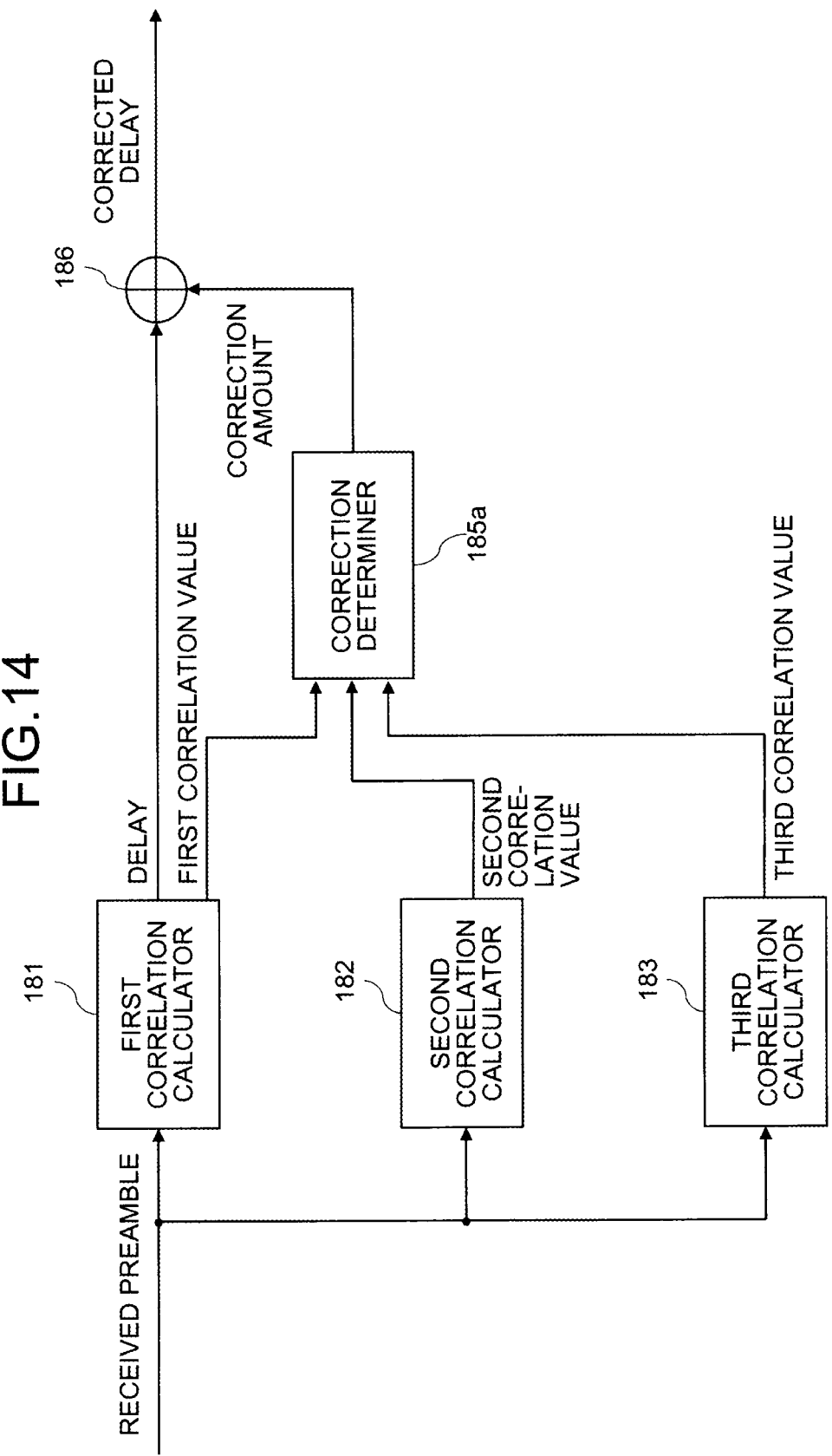
FIG. 14 is a block diagram of the delay corrector in the base station according to the second embodiment.

Configuration of the base station will be described. Configuration of the delay calculator in the base station of the present embodiment is depicted in FIG. 14. In FIG. 14, components identical to those depicted in FIG. 8 are given the same reference numerals used in FIG. 8 and redundant description thereof is omitted. In FIG. 14, a third correlation calculator 183 correlates the sequence that is in the preamble obtained by the demodulator/decoder 13 and received during the third sequence detection interval and the known 64 types of sequences (replicas), and thereby detects the used sequence type. The third correlation calculator 183 further calculates an autocorrelation value (peak value) of the detected sequence. The peak value of the autocorrelation values calculated by the third correlation calculator 183 is provided to the correction determiner 185a as the third correlation value.

The correction determiner 185a, according to the comparison result of the first correlation value and the second correlation value and the comparison result of the first correlation value and the third correlation value, determines whether the delay calculated by the first correlation calculator 181 is to be corrected. As depicted in FIG. 13, when the preamble from the mobile station is delayed by a period of time exceeding that corresponding to a single sequence length, only a portion of the preamble sequence is included in the second sequence detection interval and the entire preamble sequence is included in the third sequence detection interval. Thus, on the condition that the ratio of the second correlation value to the first correlation value is low and the ratio of the third correlation value to the first correlation value is substantially 1 (high value), the correction determiner 185a determines that the delay requires correction. When the delay requires correction, i.e., when the preamble is determined to be delayed beyond the reception time corresponding to a single sequence length, the correction determiner 185a determines that the delay obtained by the first correlation calculator 181 is to be corrected.

As described, in the base station of the present embodiment, the second sequence detection interval and the third sequence detection interval are respectively set before and after the first sequence detection interval along a temporal axis; and using autocorrelation values obtained for each sequence detection interval, whether the delay calculated using the first sequence detection interval requires correction is determined. Consequently, compared to the base station of the first embodiment, the accuracy of determining the need for correction of the delay is improved.

Figure 15:
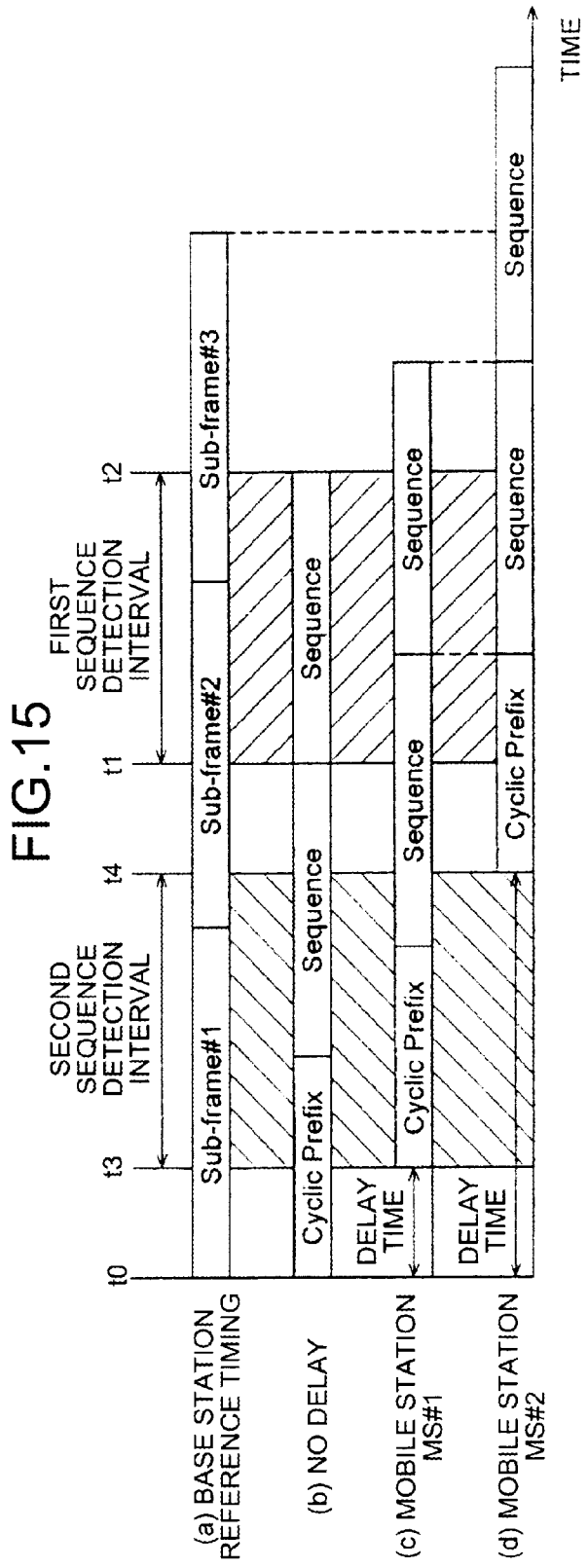
FIG. 15 is a timing chart depicting a setting example of the second sequence detection interval at the base station according to a third embodiment.

A third embodiment will be described. Optimal setting of the second sequence detection interval will be described. In the base station according to the present embodiment, the second sequence detection interval is not a fixed interval, but rather is optimally set according to the delay obtained using the first sequence detection interval. This optimal setting of the second sequence detection interval is described with reference to FIG. 15. FIG. 15 is the same drawing as FIG. 6 referred to in the first embodiment, aside from the setting of the second sequence detection interval.

The base station according to the present embodiment, upon calculating the delay based on the first sequence detection interval, sets the second sequence detection interval to start at the time when a period equivalent to the calculated delay has elapsed since the reference time t0. In the example depicted in FIG. 15, the timing of reception (at the base station) of the second sequence in the preamble from the mobile station MS#1 and the timing of the reception (at the base station) of the first sequence in the preamble from the mobile station MS#2 substantially coincide. Therefore, for the mobile station MS#1 and the mobile station MS#2, the delays calculated based on the first sequence detection interval are equivalent. Thus, in the base station according to the present embodiment, as depicted in FIG. 15, the second sequence detection interval (times t3 to t4), i.e., the same interval, is set with respect to the preambles received from the mobile station MS#1 and the mobile station MS#2.

Thus, when the second sequence detection interval is set, as depicted by (c) in FIG. 15, the start (time t3) of the second sequence detection interval coincides with the start of the preamble received from the mobile station MS#1. Meanwhile, as depicted by (d) in FIG. 15, the preamble received from the mobile station MS#2 is not included in the second sequence detection interval at all. Therefore, with respect to the preamble received from the mobile station MS#2, the autocorrelation value obtained using the second sequence detection interval is an even smaller value compared to the first embodiment where a portion of the preamble is included in the second sequence detection interval. As a result, the accuracy of determining the need for correction at the correction determiner in the base station is further improved.

Figure 16:
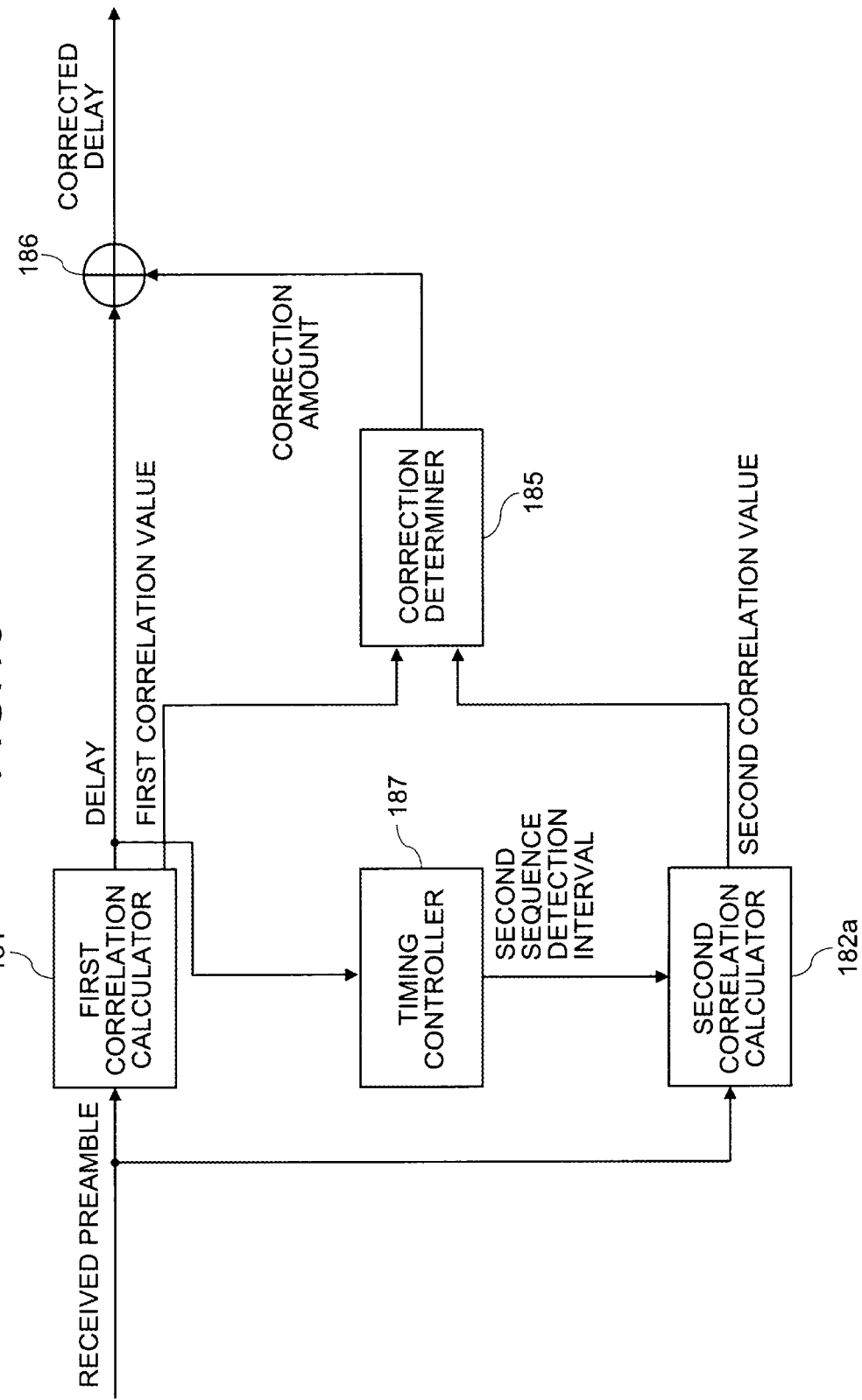
FIG. 16 is a block diagram of the delay corrector in the base station according to the third embodiment.

Configuration of the base station will be described. A configuration of the delay calculator in the base station according to the present embodiment is depicted in FIG. 16. In FIG. 16, components identical to those depicted in FIG. 8 are given the same reference numerals used in FIG. 8 and redundant description thereof is omitted. The delay calculator depicted in FIG. 16 further includes a timing controller 187, as compared to the configuration depicted in FIG. 8. The timing controller 187 receives input of the delay calculated by the first correlation calculator 181 and based on the delay, sets the second sequence detection interval. For example, in the example depicted in FIG. 15, the second sequence detection interval is set so as to start at time t3, which is a time that is after the reference time t0 by a period equivalent to the delay calculated by the first correlation calculator 181, and end at time t4, which is a time that is after time t3 by a period equivalent to a single sequence. The second correlation calculator 182a performs sequence detection and autocorrelation value (second correlation value) calculation with respect to the sequence received during the second sequence detection interval provided by the timing controller 187.

As described, in the base station according to the present embodiment, the second sequence detection interval is not a fixed interval, but rather is optimally set according to the delay obtained using the first sequence detection interval and consequently, compared to the base station of the first embodiment, improves the accuracy of determining whether correction of the delay is necessary.

A fourth embodiment will be described. The setting of a threshold for determining whether delay correction is necessary will be described. The signal quality (reception quality) of the preamble received at the base station is affected by the propagation environment between the mobile station and the base station. When the preamble reception quality is not favorable, the autocorrelation value (peak value) obtained based on the received preamble is small and variation is large. Consequently, for example, a suitable threshold (0<threshold<1) is set with respect to the ratio of the first correlation value to the second correlation value and when the necessity of delay correction is determined, with consideration of autocorrelation value variation, a high setting of the threshold is preferable from the perspective of preventing errant determinations. On the other hand, when the preamble reception quality is favorable, the autocorrelation value (peak value) obtained based on the received preamble is large and variation is small. Consequently, for example, a suitable threshold (0<threshold<1) is set with respect to the ratio of the first correlation value to the second correlation value and when the necessity of delay correction is determined, the threshold can be set low. Thus, in the base station according to the present embodiment, the threshold used in determining the need for delay correction is adjusted according to the preamble reception quality.

A configuration of the delay calculator in the base station according to the present embodiment is depicted in FIG. 17. In FIG. 17, components identical to those depicted in FIG. 8 are given the same reference numerals used in FIG. 8 and redundant description thereof is omitted. The delay calculator depicted in FIG. 17 further includes an SINR calculator 188, as compared to the configuration depicted in FIG. 8. The SINR calculator 188 calculates Signal to Noise plus Interference Ratios (SINR) as the reception quality for the preambles received from each mobile station and outputs the calculated SINR to the correction determiner 185b. Any method can be applied as the SINR calculation method. Further, SINR is but one example of reception quality and configuration may be such that a reception quality such as signal to noise ratio (SNR) is calculated. The subject of reception quality calculation is not limited to the preamble and may be the reception quality of a signal that enables estimation of the preamble reception quality.

The correction determiner 185b, when the SINR obtained from the SINR calculator 188 is greater than or equal to a given threshold (when the reception quality is favorable) and when the SINR is less than the given threshold (when the reception quality is not favorable), changes the threshold for determining whether delay correction is necessary. For example, a suitable threshold (0<threshold<1) is set with respect to the ratio of the first correlation value to the second correlation value and if the preamble reception quality is judged to be favorable when determining whether delay correction is necessary, the correction determiner 185b sets the threshold to be a low value. On the other hand, if the preamble reception quality is judged to not be favorable, the correction determiner 185b sets the threshold to a high value.

As described, in base station according to the present embodiment, the threshold used in determining the necessity of delay correction is adjusted according to the preamble reception quality and consequently, the threshold can be set to a suitable value according to the propagation environment as compared to the base station of the first embodiment.

A fifth embodiment will be described. In the base station according to the fifth embodiment, the calculation volume associated with the calculation of the preamble delay in the above embodiments is curtailed. Hereinafter, an example of the calculation volume reduction in the base station will be described with reference to FIGS. 18 and 19. FIGS. 18 and 19 respectively depict an example of a configuration of the delay calculator according to the present embodiment. In each of the drawings, components identical to those depicted in FIG. 8 are given the same reference numerals used in FIG. 8 and redundant description thereof is omitted.

A first example of calculation volume reduction will be described with reference to FIG. 18. As depicted in FIG. 18, a controller 190 outputs to the second correlation calculator 182b, an enable signal EN of a prescribed logic level, only when the first correlation value calculated by the first correlation calculator 181 is greater than a given threshold. The second correlation calculator 182b receives the enable signal EN and executes correlation calculation in the second sequence detection interval. Consequent to such a configuration, when the first correlation value is large, i.e., provided a sequence from among the 64 types of sequences is detected, the correlation calculation in the second sequence detection interval is executed. Therefore, when a sequence is not detected by the first correlation calculator 181, meaningless execution of the second correlation calculator 182b is prevented, thereby reducing the calculation volume.

A second example of calculation volume reduction will be described with reference to FIG. 19. In the first embodiment, configuration is such that at both the first correlation calculator 181 and the second correlation calculator 182, the received sequence and the known 64 types of sequences (replicas) are correlated whereby the used sequence type is detected. In contrast, in the configuration depicted in FIG. 19, information concerning the sequence detected by the first correlation calculator 181 is provided to the second correlation calculator 182c. Consequently, at the second correlation calculator 182c, correlation calculation for detecting the sequence type need not be performed, thereby reducing the calculation volume.

Although embodiments of the present invention have been described in detail, the base station and signal processing method of the invention are not limited to the above embodiments and may includes various improvements and changes within the scope of the invention. For example, in each of the embodiments, although a case where 2 fixed length sequences are included in the preamble has been described, configuration is not limited hereto. Even if 3 or more fixed length sequences are included in the preamble, the timing at which the preamble is received at the base station still varies according to the distance between the base station and the mobile station and therefore, by suitably setting the second sequence detection interval, whether the delay obtained using the first sequence detection interval requires correction can be determined. Further, when 3 or more fixed length sequences are included in the preamble, the preambles from the mobile station MS#1 and the mobile station MS#2, for example, are assumed to be received at timings that differ by a period of time that substantially corresponds to 2 fixed length sequences. Such a case can be address by successively setting 2 of the second sequence detection intervals that include a single sequence; and in each interval, executing the correlation calculation.

According to the base station and the signal processing method, the distance between the base station and a mobile station, at which uplink signal synchronization can be established therebetween, can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station that receives from a mobile station, a reference signal that includes two or more sequences of a fixed length and calculates, as time information for uplink signal synchronization at the mobile station, delay with respect to a reference time of the reference signal, the base station comprising:
a first correlator that calculates a first correlation value by correlating known sequences and the reference signal received during a first interval that is set based on the reference time and includes a period equivalent to the fixed length, the first correlator further calculating the delay with respect to the reference time;
a second correlator that calculates a second correlation value by correlating the known sequences and the reference signal received during a second interval that includes a period equivalent to the fixed length and is an interval that is different from the first interval; and
a corrector that based on a comparison result of the first correlation value and the second correlation value, determines whether to correct the delay calculated by the first correlator.

2. The base station according to claim 1, wherein
the corrector compares a ratio of the first correlation value and the second correlation value with a first threshold and upon determining, based on a result of the comparison, that the delay calculated by the first correlator is to be corrected, corrects the delay by adding to the delay, a period equivalent to the fixed length.

3. The base station according to claim 2, wherein
the first threshold is adjusted according to reception quality of the reference signal.

4. The base station according to claim 1, wherein
the second interval is set so as to start at the time when a period equivalent to the delay calculated by the first correlator has elapsed since the reference time.

5. The base station according to claim 1 and further comprising
a third correlator that calculates a third correlation value by correlating the known sequences and the reference signal received during a third interval that includes a period equivalent to the fixed length and is an interval different from the first interval and the second interval, wherein
the second interval is set so as to occur before the first interval and a third interval is set so as to occur after the first, and
the corrector, according to the comparison result of the first correlation value and the second correlation value and a comparison result of the first correlation value and the third correlation value, determines whether to correct the delay calculated by the first correlator.

6. The base station according to claim 1, wherein
whether processing by the second correlator is to be executed is determined based on a comparison result of the first correlation value and a second threshold.

7. A signal processing method of a base station when the base station receives from a mobile station, a reference signal that includes two or more sequences of a fixed length and calculates, as time information for uplink signal synchronization at the mobile station, delay with respect to a reference time of the reference signal, the signal processing method comprising:
calculating a first correlation value by correlating known sequences and the reference signal received during a first interval that is set based on the reference time and includes a period equivalent to the fixed length, and further calculating the delay with respect to the reference time;
calculating a second correlation value by correlating the known sequences and the reference signal received during a second interval that includes a period equivalent to the fixed length and is an interval that is different from the first interval; and
determining based on a comparison result of the first correlation value and the second correlation value, whether to correct the calculated delay.

8. The signal processing method according to claim 7, further comprising correcting the calculated delay by adding to the delay, a period equivalent to the fixed length, when correction of the delay is determined at the determining, wherein the determining includes comparing a ratio of the first correlation value and the second correlation value with a first threshold and based on a result of the comparison, determining whether to correct the calculated delay.

9. The signal processing method according to claim 8, wherein the determining includes adjusting the first threshold according to reception quality of the reference signal.

10. The signal processing method according to claim 7, wherein the calculating of the second correlation value includes setting the second interval so as to start at the time when a period equivalent to the calculated delay has elapsed since the reference time.

11. The signal processing method according to claim 7 and further comprising:

providing the second interval and a third interval that includes a period equivalent to the fixed length and is an interval different from the first interval and the second interval, the second interval being set so as to occur before the first interval and the third interval being set so as to occur after the first interval; and calculating a third correlation value by correlating the known sequences and the reference signal received during the third interval, wherein the determining includes determining, according to the comparison result of the first correlation value and the second correlation value and a comparison result of the first correlation value and the third correlation value, whether to correct the calculated delay.

12. The signal processing method according to claim 7 and further comprising determining, based on a comparison result of the first correlation value and a second threshold, whether the calculating of the second correlation value is to be executed.

* * * * *